(12) United States Patent
Chen et al.

(10) Patent No.: US 12,537,883 B2
(45) Date of Patent: Jan. 27, 2026

(54) SYNCHRONIZING ON-DEMAND DELIVERY SERVICES WITH A VIRTUAL EVENT WHILE MAINTAINING THE PRIVACY OF PERSONAL INFORMATION OF PARTICIPANTS

(71) Applicant: Crema Social, Inc., New York, NY (US)

(72) Inventors: Timothy Tianyi Chen, New York City, NY (US); Tony Jing Yang Xia, Toronto (CA)

(73) Assignee: Crema Social, Inc., New York City, NY (US)

( * ) Notice: Subject to any disclaimer, the term of this patent is extended or adjusted under 35 U.S.C. 154(b) by 0 days.

(21) Appl. No.: 18/630,985

(22) Filed: Apr. 9, 2024

(65) Prior Publication Data

US 2024/0348696 A1    Oct. 17, 2024

Related U.S. Application Data

(60) Provisional application No. 63/495,462, filed on Apr. 11, 2023.

(51) Int. Cl.
*G06F 15/16* (2006.01)
*H04L 9/40* (2022.01)
(Continued)

(52) U.S. Cl.
CPC .......... *H04L 67/52* (2022.05); *H04L 63/0421* (2013.01); *H04L 65/1069* (2013.01)

(58) Field of Classification Search
CPC .. H04L 63/0421; H04L 65/1069; H04L 67/52
(Continued)

(56) References Cited

U.S. PATENT DOCUMENTS

| 8,849,685 B2 * | 9/2014 | Oden | ............... G06Q 10/06311 |
| | | | 705/7.11 |
| 9,451,389 B2 * | 9/2016 | Beg | .......................... H04W 4/80 |

(Continued)

FOREIGN PATENT DOCUMENTS

EP    3502927 A1    6/2019

OTHER PUBLICATIONS

International Search Report and Written Opinion for International Application No. PCT/US2024/023908, mailed Aug. 27, 2024, 13 Pages.

*Primary Examiner* — Moustafa M Meky
(74) *Attorney, Agent, or Firm* — Lowenstein Sandler LLP

(57) ABSTRACT

A first indication that a first product was delivered via a first delivery service to a first location corresponding to a first user associated with a first user account of a service platform is received by a processing device. A second indication that a second product was delivered via a second delivery service to a second location corresponding to a second user associated with a second user account is received by the processing device. The processing device determines that first product and the second product were delivered within a first time period associated with the event based on the first indication and the second indication. Responsive to determining that the first product and the second product were delivered within the first time period, a video conference for the event is initiated between a plurality of participants comprising the first user and the second user.

20 Claims, 8 Drawing Sheets

(51) Int. Cl.
*H04L 65/1069* (2022.01)
*H04L 67/52* (2022.01)

(58) Field of Classification Search
USPC .......................................................... 709/223
See application file for complete search history.

(56) References Cited

U.S. PATENT DOCUMENTS

| | | | |
|---|---|---|---|
| 9,864,958 B2* | 1/2018 | Barnes, Jr. | H04W 4/20 |
| 10,102,546 B2* | 10/2018 | Heath | G06Q 30/0259 |
| 10,127,563 B2* | 11/2018 | Heath | G06Q 50/01 |
| 10,217,117 B2* | 2/2019 | Heath | G06Q 30/0241 |
| 10,559,019 B1* | 2/2020 | Beauvais | G06Q 30/0625 |
| 10,750,122 B2* | 8/2020 | Stewart | H04L 69/40 |
| 10,872,322 B2* | 12/2020 | Siddique | G06Q 20/306 |
| 11,507,925 B1 | 11/2022 | Chenicheri et al. | |
| 2016/0335605 A1 | 11/2016 | Tessler | |
| 2018/0165656 A1 | 6/2018 | Tessler | |
| 2019/0281030 A1* | 9/2019 | Isaacson | H04L 63/0838 |
| 2020/0137353 A1 | 4/2020 | Stewart | H04N 7/147 |
| 2021/0174339 A1* | 6/2021 | Isaacson | G06Q 20/34 |
| 2021/0374884 A1 | 12/2021 | Cupid et al. | |
| 2023/0400312 A1* | 12/2023 | Beaurepaire | G06Q 50/40 |

* cited by examiner

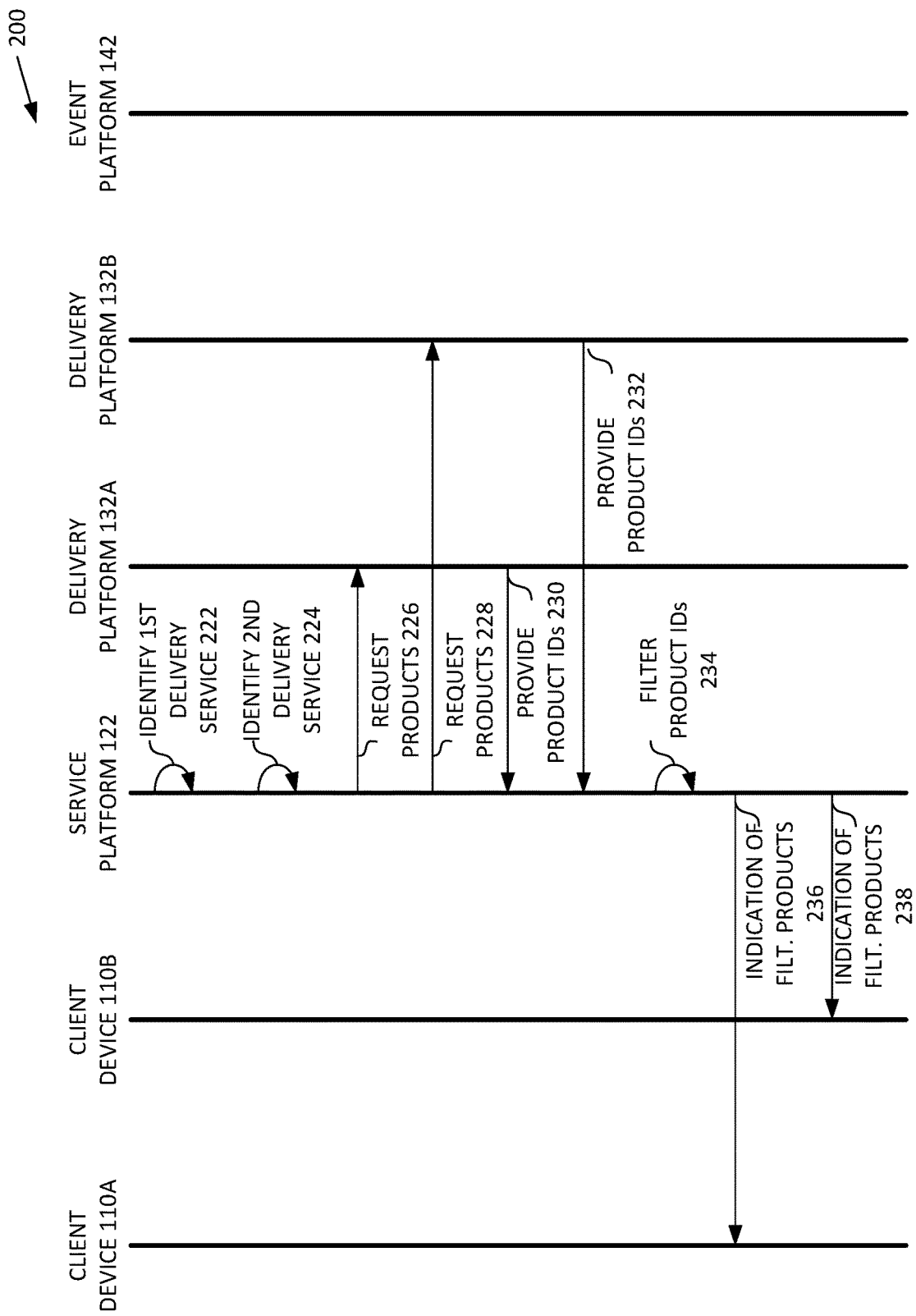

SYNCHRONIZING ON-DEMAND DELIVERY SERVICES WITH A VIRTUAL EVENT WHILE MAINTAINING THE PRIVACY OF PERSONAL INFORMATION OF PARTICIPANTS

RELATED APPLICATIONS

This application claims the benefit of U.S. Provisional Patent Application No. 63/495,462, filed Apr. 11, 2023, the entirety of which is hereby incorporated by reference herein.

TECHNICAL FIELD

Aspects and embodiments of the disclosure relate to on-demand delivery services, and more specifically, to synchronizing on-demand delivery services with a virtual event while maintaining the privacy of the personal information of participants.

BACKGROUND

A platform, such as a social media platform, can include a web-based or mobile application that enables users to create, share, and interact with content and other users within a virtual community. These platforms can facilitate various forms of communication, such as text, images, videos, and links, allowing users to connect with friends, family, colleagues, and communities of interest.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure is a method for coordinating an event with deliveries of products or services to different locations. The method includes receiving, by a processing device, a first indication that a first product was delivered via a first delivery service to a first location corresponding to a first user associated with a first user account of a service platform. The method further includes receiving a second indication that a second product was delivered via a second delivery service to a second location corresponding to a second user associated with a second user account. The method further includes determining that the first product and the second product were delivered within a first time period associated with the event based on the first indication and the second indication. The method further includes, responsive to determining that the first product and the second product were delivered within the first time period, initiating a video conference for the event and between a plurality of participants comprising the first user and the second user.

In an embodiment, the method further includes receiving, from the first user account, an indication of acceptance to the event between the first user associated with the first user account and the second user associated with the second user account.

In an embodiment, the method further includes, responsive the indication of acceptance to the event between the first user associated with the first user account and the second user associated with the second user account, identifying the first delivery service based on at least the first location corresponding to the first user, and identifying the second delivery service based on at least the second location corresponding to the second user.

In an embodiment, the method further includes selecting, among a first plurality of product identifiers associated with products available for delivery by the first delivery service, a first product identifier corresponding to the first product, and selecting, among a second plurality of product identifiers associated with products available for delivery by the second delivery service, a second product identifier corresponding to the second product.

In an embodiment, the method further includes sending, to the first delivery service, a first request to deliver the first product within the first time period and to the first location corresponding to the first user and sending, to the second delivery service, a second request to deliver the second product within the first time period and to the second location corresponding to the second user.

In an embodiment, the method further includes estimating a lead time based on historical data associated with the first delivery service, wherein the estimated lead time reflects an estimated time between sending the first request to deliver the first product and delivery of the first product, and determining a third time period to send the first request to deliver the first product based on the first time period and the estimated lead time, wherein the first request to deliver the first product is sent during the third time period.

In an embodiment, the method further includes identifying one or more delivery services available to deliver to the first location corresponding to the first user, identifying a plurality of products available for delivery to the first location by the one or the one more delivery services, providing, for selection to the first user account, identifiers of the plurality of products available for delivery to the first location, receiving, from the first user account, a selection of a first product identifier among the plurality of product identifiers, the first product identifier associated with the first product, and selecting, among the one or more delivery services, the first delivery service based on the selection by the first user account.

In an embodiment, identifying the plurality of products available for delivery to the first location by the one or more delivery services further comprises identifying the plurality of products based at least in part on a user preference associated with second user account.

In an embodiment, the method further comprises determining that the first product cannot be delivered by the first delivery service within the first time period, and, responsive to determining that the first product cannot be delivered by the first delivery service within the first time period, sending, to an alternate delivery service, a third request to deliver an alternate product within the first time period and to the first location corresponding to the first user.

In an embodiment, the first time period is an initial target time period, wherein the first time period is delayed for a period of time, and wherein the delayed time period is associated with at least one of: a delayed delivery of the first product, an agreement between the first user and the second user to delay the event, or a delayed attendance of the first user.

In an embodiment, the delayed time period is associated with the delayed delivery of the first product, the method further comprising delaying the initiation of the video conference based on the delayed time period.

In an embodiment, the method further comprises providing, to the first user account associated with the first user, a first notification that the second product was delivered to the second location corresponding to the second user, wherein the first notification to anonymizes personal information associated with the second user, the personal information comprising the second location and a name of the second user; and providing, to the second user account associated with the second user, a second notification that the first product was delivered to the first location corresponding to the first user, wherein the second notification anonymizes personal information associated with the first user, the personal information comprising the first location and a name of the first user.

In an embodiment, the method further comprises identifying an issue associated with the event, and providing, to the second user account associated with second user, a third notification related to resolving the issue, the third notification to identify the issue, propose a resolution to the issue, and at least in part anonymize personal information associated with the first user.

In an embodiment, the method further comprises delaying the initiation of the video conference based on the issue.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIGS. 2A-C are a sequence diagram of an example interaction for synchronizing on-demand delivery services in association with a virtual event, in accordance with an embodiment.

DETAILED DESCRIPTION

Figure 1:
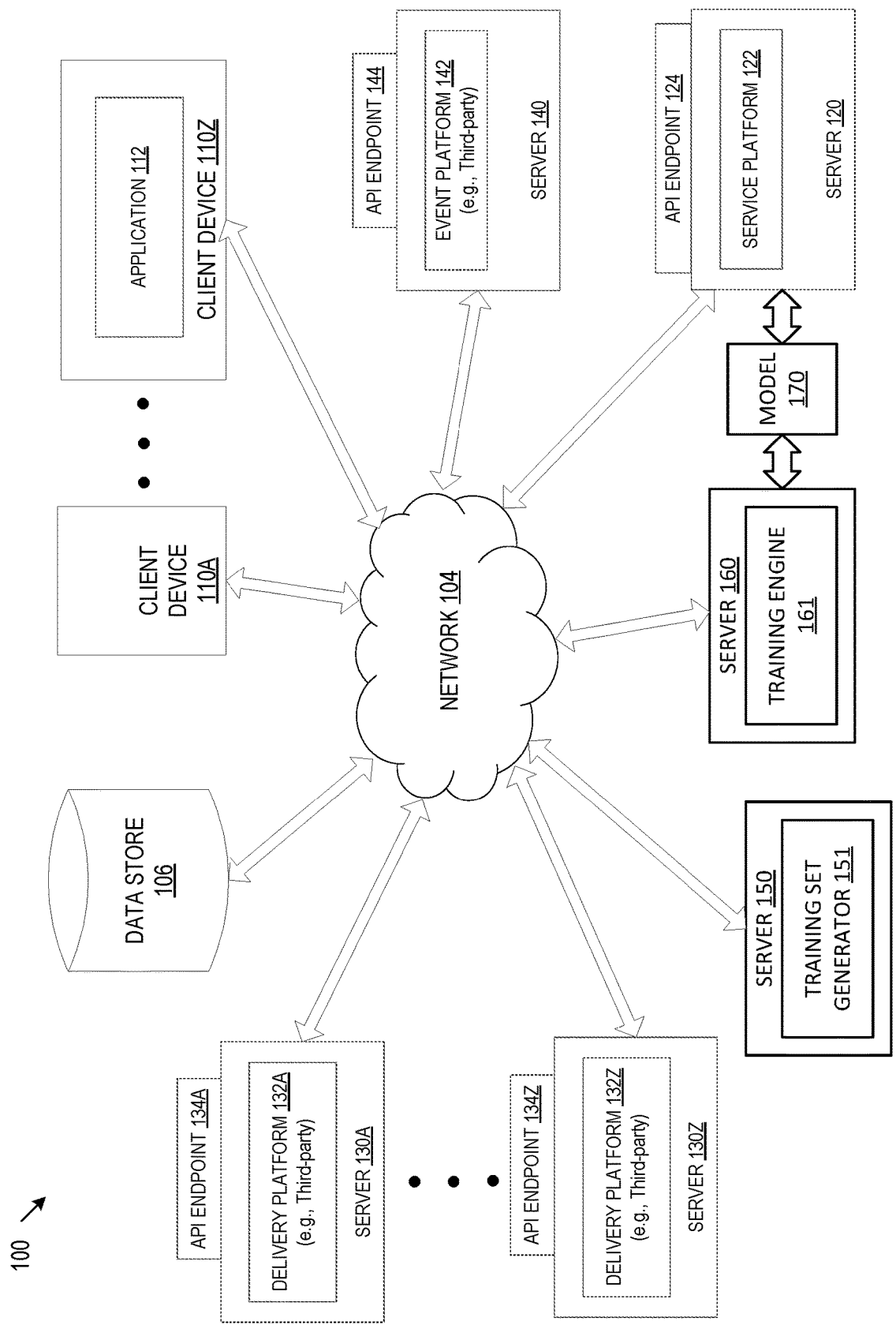
FIG. 1 illustrates an example system architecture, in accordance with some embodiments of the disclosure.

Embodiments described herein are related to methods and systems for synchronizing on-demand delivery services with a virtual event.

Some social platforms and similar systems may facilitate connections between people in geographically disparate communities. Users of social platforms may connect in peer-to-peer relationships, such as a group of friends sharing photos or other media items over the Internet. However, such social platforms do not provide the tools that allow users of the platform to coordinate the delivery of products and/or services with a virtual event implemented with video conferencing.

For example, users of some social platforms may connect in influencer-follower relationships, where one or more follower users consume content created by an influencer user. An influencer user may be a creator (e.g., an artist, actor, musician), a politician, or similar, for example. In some social systems, a follower user may desire to communicate with or share an experience with an influencer user, but it may be difficult for the follower user to get the influencer user's attention because many other follower users may be vying for the same attention. Likewise, an influencer user may experience difficulty selecting a few fans to connect with in their limited schedule. In peer-to-peer connections and influencer-follower connections, users may wish to plan a synchronous virtual event such as a video chat with food or coffee but may find it difficult to coordinate schedules and have products and services delivered simultaneously before or during the shared event.

Often to coordinate the delivery of products and/or services with a virtual event sensitive data, such as personal data, is used. For example, to deliver food to an individual the individual's delivery address and phone number are often requisite information. In scheduling a video conference, a user's electronic mail (email) and/or full name can be used and shared between participants. In many cases, it is undesirable to share sensitive data with other parties, such as other users of a social platform. It is desirable to have a system that can coordinate to coordinate the delivery of products and/or services with a virtual event and protect an individual's sensitive data so that the sensitive data is not shared with other users.

Aspects of the disclosure address the above and other challenges by providing a services platform that can facilitate the coordination of delivery of products and/or services with a virtual event while keeping sensitive data of participants of the virtual event private. In some embodiments, the service platform can receive a request for a first user account to schedule an event with another user account of the service platform. In some embodiments, the event, such as a dining event, can include the delivery of food to each participant located in separate geographical locations (e.g., different cities or countries) where the participants eat "together" and interact via video conference. The event can refer to a planned occurrence or happening that is often organized with a specific purpose (e.g., cooking event, lunch event, etc.). The event can be conducted virtually (e.g., virtual event) often with participants using a video conferencing technology. For example, the first user account can be a follower account, and the other user account can be an influencer account. The first user can invite the follower to a dining event that is sponsored by the follower user.

In some embodiments, responsive to receiving the indication of acceptance for the event, the service platform can identify a first delivery platform (e.g., delivery service) for the first location corresponding to the location of the first user and identify a second delivery platform for the second location corresponding to the location of the second user. In some embodiments, delivery platform identification may be performed in part by machine learning techniques. The service system can keep the location information confidential and not share the location information with the other participants. In some embodiments, service system can identify (e.g., via application programming interface (API)

calls to the delivery platforms) first products (e.g., food products, such as meals) that can be delivered by the first delivery platform to the first location in a specified time period (e.g., time window) and second products that can be delivered by the second delivery platform to the second location in the specified time period. In some embodiments, the first products and/or the second products can be filtered based on one or more of user preferences or service platform logic to identify a subset of products that are suitable for delivery to the first location and/or the second location. In some embodiments, indications of the identified products (or filtered products) can be sent to the respective client devices for selection by the first user and/or the second user.

In some embodiments, after receiving the product selections from the first user device and/or second user device, the service platform can send (e.g., via API calls) requests to the first delivery platform and/or second delivery platform to schedule a delivery of the respective products so that the products are delivered within a first time period at both the first location and the second location.

In some embodiments, the service platform can monitor the delivery of products to the first location and the second location and/or send updates to the first client device associated with the first user and/or second client device of the second user on the status of the deliveries. In some embodiments, if the service platform identifies that one of the first product or the second product will not be delivered within the first time period, the service platform can initiate a delivery of an alternate product from an alternate delivery platform so that the alternate product (e.g., meal) can be delivered in the first time period. In some embodiments, the service platform can initiate a rescheduling operation if it is determined that at least one of the first product or the second product cannot be delivered within the specified time period (or cannot be adequately rescheduled).

In some embodiments, responsive to determining that the first product and the second product has been delivered to the respective first and second locations, the service platform can initiate a video conference between the participant (e.g., the first user and the second user) to start the event. In some embodiments, the service platform does not share the email addresses or even names of participants with other participants of the event.

In some embodiments, the service platform can request confirmation from the participants that the respective products have been delivered to each participant. For example, the service platform can request a picture or short video (e.g., via the video conference) showing the participant and the received product.

In some embodiments, the video conference may be delayed due to delayed delivery of products and services, an agreement between users to delay the event, delayed attendance of one or more users, or other reasons. The service platform may determine to delay initiation of the video conference based on the above reasons. The service platform may provide notifications to users related to problems or other reasons for delaying the video conference. The notification may identify the issue(s), propose a resolution, and anonymize personal information associated with other users where applicable.

In some embodiments, the service platform may provide a notification to a user account that a product or service (e.g., a gift) was delivered to a second user at the second user's location. The notification may anonymize personal information associated with the second user, such as name and location.

As noted, a technical problem addressed by embodiments of the disclosure is the synchronization of on-demand delivery services with a virtual event.

Another technical problem addressed by the embodiments of the disclosure is protecting the sensitive information participants of a virtual event that is synchronized with delivery services.

A technical solution to the above identified technical problem may include implementing a service (e.g. service platform) that synchronizing delivery services to deliver products and/or service to different locations with a time period and initiating a video conference between participants responsive to determining that the products and/or services have been delivered to the different locations within a time period. Another technical solution includes a service platform that facilitates the coordination of delivery of products and/or services with a virtual event while not sharing sensitive data of participants among other participants of the virtual event. The technical solution can also include one or more notifications that anonymize personal information to protect the personal information of participants of the virtual event.

Thus, the technical effect may include providing system to coordinated delivery of different products and services to users in different geographic locations using different vendors and/or delivery services for each user with an initiation of a virtual event via video conference. The technical effect may also include protecting sensitive of participants of a virtual event.

FIG. 1 illustrates an example system architecture 100, in accordance with some embodiments of the disclosure. The system architecture 100 (also referred to as "system" herein) includes one or more client devices 110A-Z, one or more servers 120 through 140, data store 106, and network 104.

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing content items (such as user profiles and addresses, user content, user orders of products and services, etc.) as well as data structures to tag, organize, and index the content items. Data store 106 may be hosted by one or more storage devices, such as main memory, magnetic or optical storage-based disks, tapes or hard drives, NAS (network attached storage), SAN (storage area network), and so forth. In some embodiments, data store 106 may be a network-attached file server, while in other embodiments, data store 106 may be some other type of persistent storage such as an object-oriented database, a relational database, and so forth, that may be hosted by service platform 122 or one or more different machines coupled to service platform 122 via the network 104 (e.g., servers 120-140).

Client devices 110A-Z may include a type of computing device such as a desktop personal computer (PC), laptop computer, mobile phone, tablet computer, netbook computer, display terminals and smart devices, smart home devices, virtual assistants, virtual personal assistants, wearable device (e.g., smart watch, smart glasses, etc.) network-connected television, smart appliance (e.g., video doorbell), etc. In some embodiments, client devices 110A-Z may also be referred to as "user devices."

In some embodiments, one or more of server machines 120-160 (also referred to as "server(s)" herein) may be or include one or more computing devices (such as a rack-mount server, a router computer, a server computer, a personal computer, a mainframe computer, a laptop computer, a tablet computer, a desktop computer, etc.), data stores (e.g., hard disks, memories, databases), networks, software components, or hardware components that may be used to provide client devices 110A-Z with access to content items or to receive content items from client devices 110A-Z. For example, service platform 122 on server 120 may send schedule availability, event requests, available products and services, delivery tracking information, etc. to client devices 110A-Z. In another example, service platform 122 on server 120 may receive schedule information, event requests, product and service orders, etc. from client devices 110A-Z. In some embodiments, servers 120-160 can provide or facilitate services to client devices 110A-Z and/or among entities. For example, delivery platform 132A may be a third-party provider of services to service platform 122. Servers 120-160 may also include websites (e.g., a web page) or application back-end software that may be used to provide client devices 110A-Z with content and services described herein. In some embodiments, platforms 122-142 can be distributed across multiple servers. For example, service platform 122 can be distributed across a plurality of servers 120 (not depicted).

In some embodiments, a "user" or a "party" may be represented as a single individual (e.g., a friend, an influencer or creator, a follower). In some embodiments, a "user" or "party" may be represented as a group of individuals (e.g., a group of followers) or an entity (e.g., a vendor or delivery service provider). In some embodiments, users may be associated with qualifications or qualifying activities. For example, prospective influencers or creators may be required to provide sample creations or demonstrate a threshold number of followers on another platform. In another example, followers may be required to provide some form of identification such as photo ID or a live video of the user's face before the user may be permitted to interact with an influencer or another user.

Server 120 includes service platform 122 that is capable of connecting one or more client devices with other client devices and/or one or more services provided at service platform 122 and/or coordinate or facilitate services or delivery of products offered by other platforms. For example, service platform 122 may include a social media platform. In some embodiments, service platform 122 may include one or more services for providing event scheduling, synchronizing on-demand delivery services in different locations in association with the event, and/or handling associated delivery delays. In some embodiments, the service platform 122 can be a first-party platform. An example method that may be performed by service platform 122 to provide these features is described with respect to FIGS. 3A-B. In some embodiments, service platform may include a communications interface, such as API endpoint 124, for communicating with client devices 110A-Z (or users thereof) and service providers.

In some embodiments, API endpoint 124 (and other API endpoints depicted in FIG. 1) can be one end of a communication channel, where the other end can be another system, such as a client devices 110A-Z. In some embodiments, API endpoint 124 can include or be accessed using a resource locator, such a universal resource identifier (URI), universal resource locator (URL), of a server or service. API endpoint 124 can receive requests from other systems, and in some cases, return a response with information responsive to the request. In some embodiments, HTTP (Hypertext Transfer Protocol), HTTPS (Hypertext Transfer Protocol Secure) methods (e.g., API calls) can be used to communicate to and from API endpoint 124.

In some embodiments, API endpoint 124 can function as a computer interface through which access requests are received and/or created. In some embodiments, API endpoint 124 can include a platform API whereby external entities or systems can request access to services and/or information provided by service platform 122. The API can be used to programmatically obtain services and/or information associated with a request for services and/or information.

In some embodiments, client devices 110A-Z, server 130A-130Z, and server 140 can access the service platform 122 through network 104 using one or more application programming interface (API) calls via platform API endpoint 124. Similarly, in some embodiments, service platform 122 can access server 130A-130Z and server 140 using one or more API calls via the respective API endpoints, and vice versa. In some embodiments, service platform 122 can include multiple platform API endpoints 124 that can expose services, functionality, or information of the service platform to one or more client devices 110A-Z.

In some embodiments, the API of the platform API endpoint 124, API endpoint 134A-Z, and API endpoint 144 can be any suitable type of API such as a REST (Representational State Transfer) API, a GraphQL API, a SOAP (Simple Object Access Protocol) API, and/or any suitable type of API. In some embodiments, the service platform 122 (or other platforms, described herein) can expose through the API, a set of API resources which when addressed can be used for requesting different actions, inspecting state or data, and/or otherwise interacting with the service platform 122. In some embodiments, a REST API and/or another type of API can work according to an application layer request and response model. An application layer request and response model can use HTTP (Hypertext Transfer Protocol), HTTPS (Hypertext Transfer Protocol Secure), SPDY, or any suitable application layer protocol. Herein HTTP-based protocol is described for purposes of illustration, rather than limitation. The disclosure should not be interpreted as being limited to the HTTP protocol. HTTP requests (or any suitable request communication) to the service platform 122 (or other platforms, described herein) can observe the principles of a RESTful design or the protocol of the type of API. RESTful is understood in this document to describe a Representational State Transfer architecture. The RESTful HTTP requests can be stateless, thus each message communicated contains all necessary information for processing the request and generating a response. The platform API can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, users of service platform 122 can access services of and/or coordinated by service platform 122 via user accounts. In some embodiments, users can be authenticated and sign into a user account using user credentials, such as username and/or password. In some embodiments, subsequent to authentication service platform 122 can determine which service(s) and/or information the user account is authorized to access.

In some embodiments, service platform 122 may offer services, as described herein and/or coordinate services of different platforms (e.g., delivery platforms 132A-132Z and event platform 142) and provide the services to client device 110A-Z via the respective applications 112.

In some embodiments, service platform 122 may include language translation capabilities for translating communications between users, vendors, and delivery services speaking different languages. In some embodiments, language translation capabilities may be provided by a third-party translation service, e.g., via an API (not depicted).

Servers 130A-Z include delivery platforms 132A-Z that are capable of delivering products and services to various geographic locations. In some embodiments, platforms 132A-Z coordinate delivery drivers to deliver products and services to one or more physical locations corresponding to one or more users. In some embodiments, platforms 132A-Z coordinate autonomous delivery of products and services using autonomous vehicles, drones, etc. Products and services can include physical goods and services (e.g., food, coffee, groceries, flowers, birthday party or entertainment services, etc.) and/or virtual goods and services (e.g., e-gift cards, coupons, non-fungible tokens, etc.). In some embodiments, a client device of client devices 110A-Z (e.g., a client device associated with a user) or service platform 122 may communicate with delivery platforms 132A-Z to order or request products and services to be delivered, provide delivery addresses, and track delivery progress. For example, service platform 122 may communicate with delivery platforms 132A-Z via API endpoints 134A-Z. In some embodiments, delivery platforms 132A-Z may receive orders for products and services on behalf of one or more vendors (not depicted), and then at an appropriate time forward orders to the respective vendors and coordinate delivery. In some embodiments, delivery platforms 132A-Z may receive delivery requests only, with the orders having been placed with the vendor(s) separately; thus, coordination between vendor and delivery service is provided by the ordering entity. In some embodiments, one or more of delivery platforms 132A-Z are provided by vendors (e.g., restaurant, grocery store, flower shop, coffee shop, etc.) and each vendor provides delivery for orders received for its products and services. In some embodiments, each delivery platform 132A-Z may serve different geographic areas, cater to limited products and services, or be distinguishable from other delivery platforms 132A-Z in other ways. In some embodiments, delivery platforms 132A-Z may provide an application, website, or other interface for client devices 110A-Z. In some embodiments, delivery platforms 132A-Z may be third-party platforms with respect to service platform 122 (e.g., platforms not under ownership or control of users or service platform 122). In some embodiments, delivery platforms 132A-Z may be different third-party platforms. For example, delivery platform 132A may be controlled by third-party A and delivery platform 132Z may be controlled by third-party Z. In some embodiments, one or more of delivery platforms 132A-Z may be first-party platforms.

In some embodiments, a first party can refer to an entity (e.g., legal entity) that develops, owns, supports and/or provides an application, program or service(s) to users. Often, users access the services via user accounts. In some embodiments, a third party can refer to an entity external to the first party that develop, owns, or provides an application, program or service(s). The third party can include an external entity (e.g., external to the first party) that is independent from the first entity. The third party does not control the application, program or services of the first party.

Server 140 includes event platform 142 that is capable of scheduling, hosting, and/or coordinating virtual events. For example, event platform 142 may include one or more of a video conferencing platform, an audio or VoIP platform, a chat platform, a gaming platform, and so forth. In some embodiments, a client device may communicate, via the service platform 122, with event platform 142 to schedule and/or participate in an event. For example, service platform 122 may communicate with event platform 142 via API endpoint 144. In some embodiments, service platform 122 may communicate with event platform 142 to host an event, such that event participants (e.g., client devices 110A-Z) communicate with server 120 and/or server 140 over network 104. In some embodiments, service platform 122 may communicate with event platform 142 to coordinate peer-to-peer events, such that event participants (e.g., client devices 110A-Z) communicate directly with each other over network 104. In some embodiments, event platform 142 may provide an application, website or other interface for client devices 110A-Z. In some embodiments, an interface for event platform 142 may be embedded in a GUI associated with the service platform (e.g., as described with reference to FIG. 3). In some embodiments, a plurality of event platforms 142 may be connected to network 104 (e.g., each with its own server 140 and API endpoint 144). Each event platform 142 may provide different types of events (e.g., audio or video) and may use different protocols (e.g., streaming compression, encryption). Event platforms may or may not be compatible with each other. For example, it may be possible to establish a video connection between two different platforms. In some embodiments, an event platform may be a first-party platform associated with the service platform. In some embodiments, an event platform may be a third-party platform not associated with the service platform.

Client devices 110A-Z can include application 112 associated with service platform 122, which may include a graphical user interface (GUI). Application 112 may receive input from users such as schedule availability, event requests, orders for products and services, messages to other users, etc. Application 112 may present information to users, such as event requests, available products and services, delivery tracking information, event portals, etc. In some embodiments, GUI components associated with delivery platforms 132A-Z and/or event platform 142 may be included in application 112. For example, application 112 may include an embedded delivery tracking map or an embedded video conference player. In such examples, GUI components and content may be retrieved from delivery platforms 132A-Z and event platform 142 via API endpoints 134A-Z and 144 by service platform 122, which may forward GUI components and content to application 112. In some embodiments, application 112 may direct users to other applications or interfaces (e.g., websites) associated with delivery platforms 132A-Z and/or event platform 142, e.g., using hyperlinks.

In some embodiments, one or more of servers 130-160 or associated platforms may be combined. For example, event platform 142 may be provided by service platform 122 on server 120. In another example, service platform 122 may provide its own delivery platform while simultaneously coordinating with external delivery platforms 132A-Z.

In situations in which the systems discussed here collect personal information about users, or may make use of personal information, the users may be provided with an opportunity to control whether platforms 122-142 collect user information (e.g., information about a user's social network, social actions or activities, profession, a user's preferences, or a user's current location), or to control whether and/or how to receive content from platforms 122-142 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by platforms 122-142.

In some embodiments, a machine learning model (e.g., also referred to as an "artificial intelligence (AI) model" herein) can include a discriminative machine learning model (also referred to as "discriminative AI model" herein), a generative machine learning model (also referred to as "generative AI model" herein), and/or other machine learning model.

In some embodiments, a discriminative machine learning model can model a conditional probability of an output for given input(s), A discriminative machine learning model can learn the boundaries between different classes of data to make predictions on new data. In some embodiments, a discriminative machine learning model can include a classification model that is designed for classification tasks, such as learning decision boundaries between different classes of data and classifying input data into a particular classification. Examples of discriminative machine learning models include, but are not limited to, support vector machines (SVM) and neural networks.

In some embodiments, a generative machine learning model learns how the input training data is generated and can generate new data (e.g., original data). A generative machine learning model can model the probability distribution (e.g., joint probability distribution) of a dataset and generate new samples that often resemble the training data. Generative machine learning models can be used for tasks involving image generation, text generation and/or data synthesis. Generative machine learning models include, but are not limited to, gaussian mixture models (GMMs), variational autoencoders (VAEs), generative adversarial networks (GANs), large language models (LLMs), visual language models (VLMs), multi-modal models (e.g., text, images, video, audio, depth, physiological signals, etc.), and so forth.

Training of and inference using discriminative machine learning models and generative machine learning models is described herein. It should be noted that although the training of and inference using discriminative machine learning model and generative machine learning model are described separately for the purposes of clarity, it can be appreciated that elements described with respect to discriminative machine learning models can apply to generative machine learning models, and vice versa, unless otherwise described.

In some embodiments, some elements of FIG. 1, such as training set generator 151 of server machine 150, training engine 161 of server machine 160, and model 170 can apply to a discriminative machine learning model, unless otherwise described.

Server machine 150 includes a training set generator 151 that is capable of generating training data (e.g., a set of training inputs and a set of target outputs) to train a model 170 (e.g., a discriminative machine learning model). In some embodiments, training set generator 151 can generate the training data based on various data (e.g., stored at data store 106 or another data store connected to system 100 via the network 104). Data store 106 can store metadata associated with the training data.

Server machine 160 includes a training engine 161 that is capable of training a model 170 using the training data from training set generator 151. The model 170 (also referred to "machine learning model" or "artificial intelligence (AI) model" herein) may refer to the model artifact that is created by the training engine 161 using the training data that includes training inputs (e.g., features) and corresponding target outputs (correct answers for respective training inputs) (e.g., labels). The training engine 161 may find patterns in the training data that map the training input to the target output (the answer to be predicted) and provide the model 170 that captures these patterns. The model 170 may be composed of, e.g., a single level of linear or non-linear operations (e.g., a support vector machine (SVM), or may be a deep network, i.e., a machine learning model that is composed of multiple levels of non-linear operations). An example of a deep network is a neural network with one or more hidden layers, and such machine learning model may be trained by, for example, adjusting weights of a neural network in accordance with a backpropagation learning algorithm or the like. Model 170 can use one or more of a support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc. For convenience rather than limitation, the remainder of this disclosure describing discriminative machine learning model will refer to the implementation as a neural network, even though some implementations might employ other type of learning machine instead of, or in addition to, a neural network.

In some embodiments, such as with a supervised machine learning model, the one or more training inputs of the set of the training inputs are paired with respective one or more training outputs of the set of training outputs. The training input-output pair(s) can be used as input to the machine learning model to help train the machine learning model to determine, for example, patterns in the data.

In some embodiments, training data, such as training input and/or training output, and/or input data to a trained machine learning model (collectively referred to as "machine learning model data" herein) can be preprocessed before providing the aforementioned data to the (trained or untrained) machine learning model (e.g., discriminative machine learning model and/or generative machine learning model) for execution. Preprocessing as applied to machine learning models (e.g., discriminative machine learning model and/or generative machine learning model) can refer to the preparation and/or transformation of machine learning model data.

In some embodiments, preprocessing can include data scaling. Data scaling can include a process of transforming numerical features in raw machine learning model data such that the preprocessed machine learning model data has a similar scale or range. For example, Min-Max scaling (Normalization) and/or Z-score normalization (Standardization) can be used to scale the raw machine learning model. For instance, if the raw machine learning model data includes feature representing temperatures in Fahrenheit, the raw machine learning model data can be scaled to a range of [0, 1] using Min-Max scaling.

In some embodiments, preprocessing can include data encoding. Encoding data can include a process of converting categorical or text data into a numerical format on which a machine learning model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories, but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, preprocessing can include data embedding. Data embedding can include an operation of representing original data in a different space, often of reduced dimensionality (e.g., dimensionality reduction), while preserving relevant information and patterns of the original data (e.g., lower-dimensional representation of higher-dimensional data). The data embedding operation can transform the original data so that the embedding data retains relevant characteristics of the original data and is more amenable for analysis and processing by machine learning models. In some embodiments embedding data can represent original data (e.g., word, phrase, document, or entity) as a vector in vector space, such as continuous vector space. Each element (e.g., dimension) of the vector can correspond to a feature or property of the original data (e.g., object). In some embodiments, the size of the embedding vector (e.g., embedding dimension) can be adjusted during model training. In some embodiments, the embedding dimension can be fixed to help facilitate analysis and processing of data by machine learning models.

In some embodiments, the training set is obtained from server machine 120. Server machine 120 includes service platform 122 that provides current data (e.g., user data, event data, delivery tracking data, etc.) as input to the trained machine learning model (e.g., model 170) and runs the trained machine learning model (e.g., model 170) on the input to obtain one or more outputs.

In some embodiments, confidence data can include or indicate a level of confidence of that a particular output (e.g., output(s)) corresponds to one or more inputs of the machine learning model (e.g., trained machine learning model). In one example, the level of confidence is a real number between 0 and 1 inclusive, where 0 indicates no confidence that output(s) corresponds to a particular one or more inputs and 1 indicates absolute confidence that the output(s) corresponds to a particular one or more inputs. In some embodiments, confidence data can be associated with inference using a machine learning model.

In some embodiments, machine learning model, such as model 170, may be (or may correspond to) one or more computer programs executed by processor(s) of server machine 120 and/or server machine 160. In other embodiments, machine learning model may be (or may correspond to) one or more computer programs executed across a number or combination of server machines. For example, in some embodiments, machine learning models may be hosted on the cloud, while in other embodiments, these machine learning models may be hosted and perform operations using the hardware of a client device 110A-Z. In some embodiments, the machine learning models may be a self-hosted machine learning model, while in other embodiments, machine learning models may be external machine learning models accessed by an API.

Figure 2A:
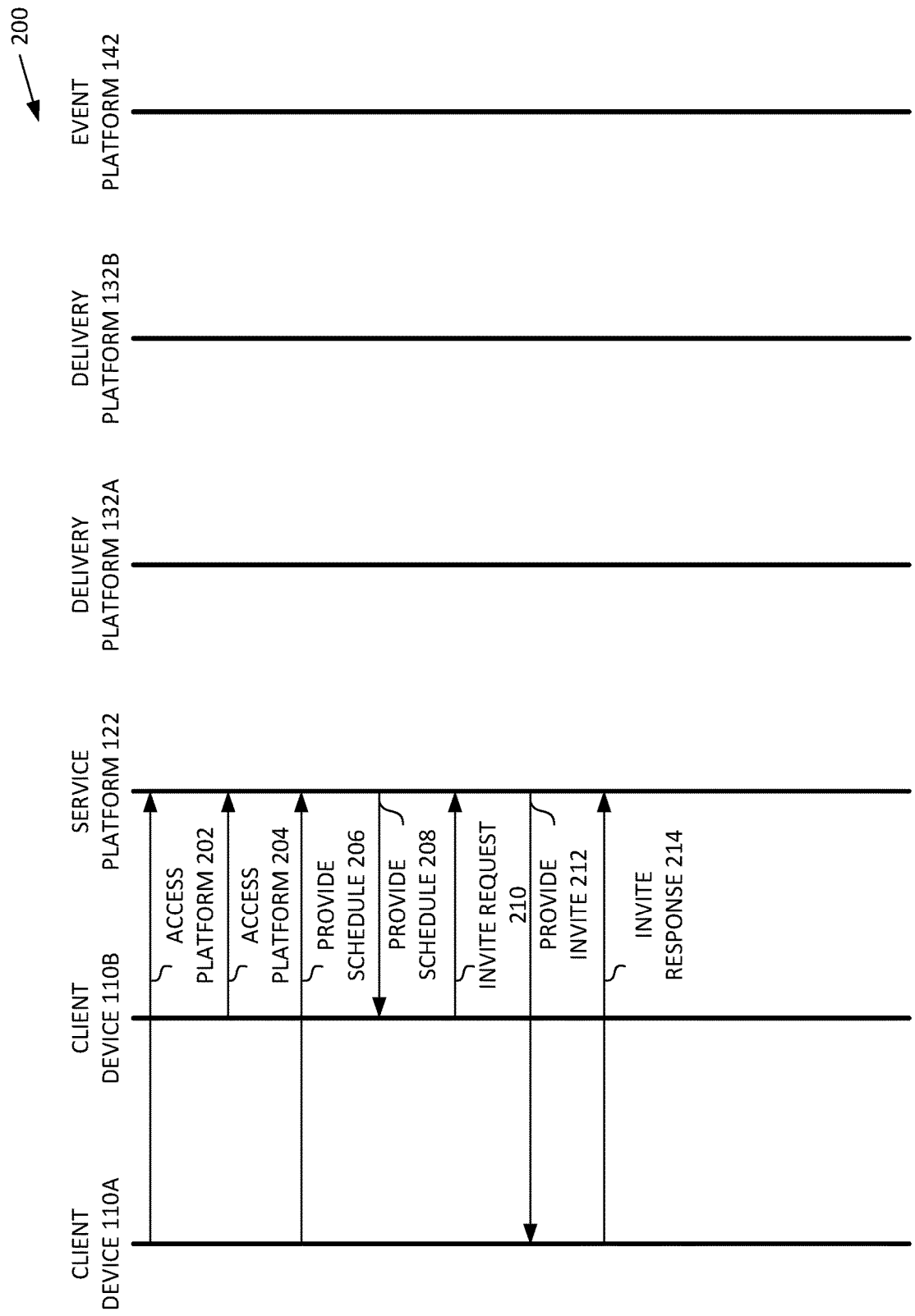
Figure 2C:
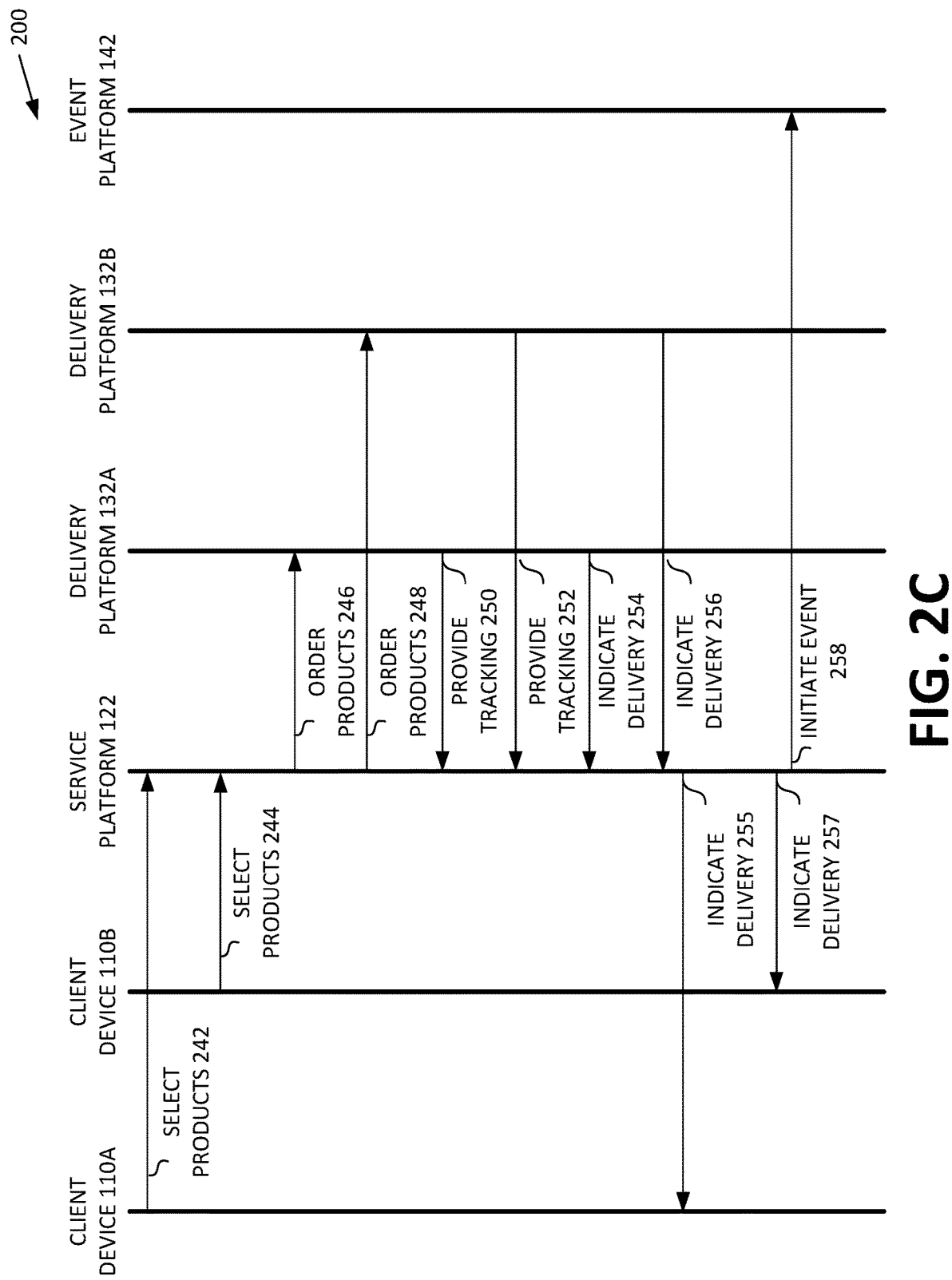

FIGS. 2A-C are a sequence diagram of an example interaction 200 between client devices 110A-B, service platform 122, delivery platforms 132A-B, and event platform 142 for synchronizing on-demand delivery services with a virtual event, in accordance with some embodiments of the disclosure. In some embodiments, operations depicted in FIGS. 2A-C can occur in a different order or be performed by different components than depicted. Various embodiments may include additional operations or components not depicted in FIGS. 2A-C or a subset of operations or components depicted in FIGS. 2A-C or different operations or components depicted in FIGS. 2A-C. The operations depicted in FIGS. 2A-C may correspond to different communication sessions or different timing intervals. For example, some operations may proceed in immediate succession or may be part of a single communication session, while other operations may be spread out over time or may be part of different communication sessions. For the sake of illustration, rather than limitation the first user can be an influencer (influencing user) and the second user can be a following user. It can be noted that in some embodiments, the first and the second user can be any type of user and/or have any type of relationship. For the sake of illustration, rather than limitation, two users (and associated user accounts) are described. In some embodiments, two or more users can be part of a virtual event.

At operation 202, a first user, via client device 110A, accesses service platform 122 using, for example, one or more user credentials that allow the first user to be authenticated. The user can be associated with a first user account responsive to a successful authentication. Similarly, at operation 204, a second user, via client device 110B, accesses service platform 122 using one or more user credentials that allow the second user to be authenticated. The user can be associated with a second user account. While FIGS. 2A-C depict two client devices 110A-B corresponding to two users, three or more users may be included in various embodiments. In some embodiments, as described with respect to FIG. 1, the first and second users (and any additional users) may be any combination of users, such as one or more influencer users and one or more follower users, or a plurality of friends or family members.

In some embodiments, users may indicate various preferences described herein. The user preferences can be stored and associated with the respective user accounts. For example, the first user may indicate dietary preferences or a maximum price limit that is associated with the first user account. In another example, the second user may indicate gift preferences or a minimum price limit that is associated with the second user account.

In some embodiments, users may be required to complete qualifying activities (e.g., upload creative content or provide identification for influencers, verifying identity for followers) before they may be permitted to join the platform and create a user account, post an event schedule, and/or send an event invite.

At operation 206, the first user, via client device 110A, provides a schedule of availability for virtual events to service platform 122. For example, an influencer user may provide a list of available time slots for an event (e.g., a lunch event) in application 112 at the influencer user's client device. In some embodiments, the schedule of availability of the first user can be broadcast to user accounts of the service platform 122. In some embodiments, the schedule of availability of the first user can be provided to a select number of user accounts based on one or more criteria. For example, the schedule of availability can be provided to only followers of the first user. In another example, the first user can designate to which user accounts the first user's schedule of availability is to be provided. In some embodiments, the first user account can receive a request from another user account, such as a second user account, and provide the schedule of availability in response to the request.

At operation 208, service platform 122 provides the first user's schedule to the second user via client device 110B. In the influencer/follower example, a follower user (or a plurality of follower users) may view the influencer user's availability in application 112 at the follow user's client device and select an available event, date, and time to meet (e.g., virtually meet) with the influencer.

At operation 210, client device 110B associated with the second user sends a request to invite to the service platform inviting the second user to a virtual event. In some embodiments, the second user, via client device 110B, creates an invite to a virtual event between at least the first user and the second user. For example, a follower user may send an invite to an influencer user for an open time slot on the influencer user's schedule. In another example, a first user (e.g., a first friend) may send a calendar invite email comprising an event, date, and time to a second user (e.g., a second friend). In some embodiments, the following user can send one or more proposed event times and/or dates. The proposed event times and/or dates may or may not be from first user's schedule of availability. In some embodiments, a bidding or lottery system can be used to match following users to events offered by influencer users. Thus, sending an invite may not be necessary or may be disabled.

At operation 212, service platform 122 provides an invitation to the first user via client device 110A. In some embodiments, the invitation can include the information such as one or more days and/or times proposed for the virtual event.

At operation 214, the first user account, via client device 110A, provides a response to the invite. In some embodiments, the response can include a rejection of the invitation. In some embodiments, the response can include an acceptance of the invite to service platform 122. Service platform 122 may subsequently identify a date, time and type of event (e.g., video conference, phone call, etc.) that have been agreed to by the parties. For example, service platform 122 may identify the agreed-upon event, date, and time on receiving confirmation of the above-mentioned or other agreement events from application 112 and/or client devices 110A-Z, such as via an API call to API endpoint 124. In some embodiments, a user may be required to complete a transaction before an event can be scheduled. For example, a follower user may be required to pay a threshold amount of currency to schedule an event with an influencer user, a portion of which currency may later be used to pay for the influencer's selected products and services.

Moving to FIG. 2B, at operation 222, service platform 122 identifies a first delivery service associated with delivery platform 132A based on a location corresponding to the first user and/or client device 110A. Similarly, at operation 224, service platform 122 identifies a second delivery service associated with delivery platform 132B based on a location corresponding to the second user and/or client device 110B. In some embodiments, multiple delivery services may be identified for each user and/or location.

In some embodiments, the first and second delivery services may be different delivery services. In some embodiments, the first and second delivery services may be the same delivery services. In some embodiments, the first and second locations may be in the same or different geographic area, such as a city, state, province, country, etc. In some embodiments, the first delivery service may serve the first location (and associated geographic area) while not serving the second location (and associated geographic area), and the second delivery service may serve the second location but not the first location. For example, the first delivery service may be a domestic delivery service associated with one country, and the second delivery service may be a domestic delivery service associated with a second country. In some embodiments, the first delivery service may be one of a plurality of delivery services identified based on the first location. Similarly, the second delivery service may be one of a plurality of delivery services identified based on the second location.

In some embodiments, service platform 122 may determine delivery services based on a location corresponding to a user, such as a user's physical address received in operations 202 or 204 when the user joined the platform, a user's physical address stored in service platform 122 (or data store 106), a GPS location associated with a user's client device (e.g., client devices 110A-Z), and/or a location corresponding to an internet protocol (IP) address. For example, available delivery service providers may be identified based on the user's physical address/location and the service area and hours of operation of local delivery service providers. Service area may be queried from delivery platforms, for example, via an API such as API endpoints 134A-Z associated with delivery platforms 132A-Z of FIG. 1.

In some embodiments, service platform 122 may determine delivery services using machine learning techniques. For example, service platform 122 may train a machine learning model (e.g., model 170) to select from available delivery services based on input features such as one or more of location, event time, delivery service reliability, reliability of individual delivery service drivers, types of products and services selected (as described below), or similar. In some embodiments, to train the machine learning model, the training inputs can include one or more location, event time, delivery service reliability, reliability of individual delivery service drivers, types of products and services selected (as described below). In some embodiments, the one or more training inputs can be paired with a training output. In some embodiments, the training output can include an indication of a delivery service. In some embodiments, the trained machine learning model can used in inference. The input to the trained machine learning model can include one or more of location, event time, delivery service reliability, reliability of individual delivery service drivers, types of products and services selected. The output of the trained machine learning model can include an indication of a delivery service and a level of confidence that the delivery service can deliver a product or service.

At operation 226, service platform 122 requests product and/or service identifiers from delivery platform 132A associated with a first physical location corresponding to the first user. Similarly, at operation 228, service platform 122 requests product and/or service identifiers from delivery platform 132B associated with a second physical location corresponding to the second user. In some embodiments, the first physical location and the second physical location are different locations. In some embodiments, the different physical locations can include one or more of a different country, state, province, city, building, and so forth. In some embodiments, the product identifiers may correspond to menu information, which may be queried from delivery platforms and other vendors, for example, via an API such as API endpoints 134A-Z associated with delivery platforms 132A-Z of FIG. 1.

At operation 230, delivery platform 132A provides product and/or service identifiers to service platform 122 (e.g., in response to operation 226). Similarly, at operation 232, delivery platform 132B provides product and/or service identifiers to platform 122 (e.g. in response to operation 228).

At operation 234, service platform 122 filters product and/or service identifiers received from delivery platforms 132A-B. In some embodiments, service platform 122 filters product and/or service identifiers based on a party's location (e.g., rather than based on products available for delivery by a particular delivery service), such as a user's address stored in service platform 122 (or data store 106) or a GPS location associated with a user's client device (e.g., client devices 110A-Z). For example, available restaurants may be identified based on the user's address/location and the service area and hours of operation of local restaurants.

In some embodiments, service platform 122 filters product and/or service identifiers based on user preferences and configurations. For example, a user may indicate (e.g., in application 112) dietary preferences and restrictions, which service platform 122 may take into account when determining available products and services. Menu items obtained from a delivery platform or restaurant (e.g., via API endpoints 134A-Z) may be further sorted or queried based on the dietary preferences or restrictions of the user (e.g. stored as user preference information). Other information may be used in determining available products and services in association with the event, such as one or more of users' pricing preferences, estimated delivery time, reliability of delivery service/driver, seasonal availability of products and services, the theme of the event, etc. For example, service platform 122 may identify the plurality of products available for delivery to the first physical location (corresponding to the first user associated with a first user account) by one or more delivery services based at least in part on a user preference associated with the second user account. For instance, the user preferences of the second user account that can be used to filter products and/or services for the first user account can include one or more of a price limit, desired theme (e.g., ethnic/cultural theme, holiday theme, etc.) and so forth. In another example, an event coordinator or administrator (e.g., a third party such as an influencer's manager or a virtual party host) may specify an acceptable price range, a preferred vendor or quality ranking, or a limited list of pre-selected items that may be ordered by participating parties. As an additional example, a follower user may specify an upper price limit for an influencer to spend (e.g., since the follower user is paying), or similarly an influencer user may specify a minimum price limit that a follower user must be willing to pay in order to schedule an event with the influencer user.

In some embodiments, available products and services may be determined and/or ranked based on the time of day in each user's location. For example, the scheduled event may take place around breakfast time for the first user and dinner time for the second user. For the first user, breakfast food products would be ranked higher than dinner food products. For the second user, dinner food products would be ranked higher than breakfast food products. In some embodiments, different products and services may be available to different parties, which may be from different vendors and deliverable by different delivery service providers. In some embodiments, service platform 122 may only determine products and services that are available to all parties in association with the event.

In some embodiments, service platform 122 filters product and/or service identifiers based on user selections or other user input. For example, service platform 122 may receive user selections from order element 306 described with reference to FIG. 3. In some embodiments, service platform 122 may determine a time period (e.g., ordering window) for parties to select products and services for delivery based on the previously agreed-upon event time. For example, service platform 122 may identify an anticipated delivery time for a specific delivery service or delivery driver and subtract the anticipated delivery time from the event time to determine a time cutoff for placing an order with that delivery service. In another example, a time cutoff may be a set time before the event, e.g., 24 hours in advance. In some embodiments, the time period may be determined based on whether products and services must be delivered before, during, or after the event. In some embodiments, the determined time period may be different for different products and services. For example, a cutoff time may be earlier for a flower shop a long distance away from the user and shorter for a fast-food restaurant close to the user.

At operation 236, service platform 122 provides an indication of filtered products and/or services associated with delivery platform 132A to the client device 110A associated with the first user. Similarly, at operation 236, service platform 122 provides an indication of filtered products and/or services associated with delivery platform 132B to the client device 110B associated with the second user. In some embodiments, the indication of products and/or services may be presented to users of the respective client devices for selection, e.g., via ordering element 306 described with reference to FIG. 3. In some embodiments, products and/or services are not filtered and service platform 122 provides an indication of unfiltered products and services to one or more of client device 110A and client device 110B.

In some embodiments, service platform 122 may further present available products and/or services to user devices associated with users for selecting one or more backup products and/or services. Backup products and/or services may be provided to users and selected by users in association with (e.g., at the same time as) the primary products and services provided to users and selected by users in ordering element 306. In some embodiments, available backup products and/or services may be provided and/or ranked based on the backup products and services being associated with different vendors or delivery services than the primary products and services, which may provide improved backup options in case a primary vendor or delivery service is unable to complete the primary order. In some embodiments, service platform 122 may automatically choose backup products and services on the user's behalf. For example, service platform 122 may choose the next highest-ranked product or service for the user or may choose a product or service closest to the primary product or service selected by the user in ordering element 306.

In some embodiments, service platform 122 may determine an updated availability or status of indicated products and/or services for one or more parties. For example, service platform 122 may check (e.g., hours before or the day of the event) that all products are available and determine updated delivery estimates. In some embodiments, service platform 122 may also determine an updated availability or status of backup products.

Proceeding to FIG. 2C, at operation 242, the first user, via client device 110A, provides a product and/or service selection to service platform 122 based on the indication of filtered products and/or service sent to client device 110A. Similarly, at operation 244, the second user, via client device 110B, provides a product and/or service selection to service platform 122 based on the indication of filtered products and/or service sent to client device 110B.

At operation 246, service platform 122 sends a request to delivery platform 132A to deliver products and/or services selected by the first user. Similarly, at operation 248, service platform 122 sends a request to delivery platform 132B to delivery products and/or services selected by the second user. For example, processing logic may send requests (e.g., place orders) through API endpoints 134A-Z of FIG. 1. In some embodiments, the system may place an order with a delivery service, and the delivery service coordinates with a vendor (e.g., restaurant, flower shop) to fulfill the order. In some embodiments, the system may place an order with a vendor, and the vendor coordinates with a delivery service (e.g., external to or internal to the vendor) to fulfill the order. In some embodiments, the system may place orders with and coordinate between both the vendor and delivery service. In some embodiments, the system may select a specific delivery driver of a delivery service based on one or more of the driver's average delivery time, reliability, and other metrics to ensure timely delivery of the products and services. In some embodiments, the system may place orders with multiple delivery services and/or vendors (e.g., delivery platforms 132A-Z as described with respect to FIG. 1).

In an embodiment, to determine when to perform operations 246-248, service platform 122 may estimate lead times based on historical data associated with delivery services 132A-B, wherein the estimated lead time reflects an estimated time between sending the order requests to deliver the products and the subsequent delivery of the products. Service platform 122 may further determine a third time period(s) to send the order requests to deliver the products based on the event time period and the estimated lead time, wherein the order requests to deliver to products are sent during the third time period(s). The historical data associated with delivery services 132A-B may include driver performance data associated with one or more drivers of the respective delivery services. The driver performance data may be obtained via API endpoints 134A-B. In some embodiments, service platform 122 may use a machine learning model (e.g., model 170, a forecasting model, etc.) to estimate lead times based on various input features such as historical data associated with delivery services 132A-B. In some embodiments, to estimate lead time the machine learning model can be trained on training inputs that include historical data associated with one or more of delivery services 132A-B. The training input can be paired with training output. The training output can include one or more of an indication of an amount of time from placing the order to delivery for a particular delivery service, a location associated with the delivery of a product and/or service, and a time period associated with an event. In some embodiments, the trained machine learning model can be used for inference. The trained machine learning model can receive input can include one or more an indication of one or more delivery services 132A-B, a location associated with the delivery of the product and/or service, and a time period associated with an event. The output of the trained machine learning model can include an identifier of one or more delivery services 132A-B, a lead time associated with a respective one of the delivery services 132A-B and a level of confidence that the respective delivery service can deliver a product and/or service with the lead time for the time period.

At operation 250, delivery platform 132A provides order tracking information to service platform 122. Similarly, at operation 252, delivery platform 132B provides order tracking information to service platform 122. In some embodiments, the processing logic may track the delivery of products and services to all parties. For example, the system may query or receive tracking information and delivery indications from API endpoints 134A-Z of FIG. 1. In some embodiments, the system may provide live tracking updates to each user (e.g., via a GUI), which may display the delivery progress of the user's own order and/or the orders of other users (e.g., as described with reference to FIG. 4).

In some embodiments, after an order for the first product has been placed, service platform 122 may determine that the first product cannot be delivered by the first delivery service within the first time period. For example, service platform 122 may receive an indication from the first delivery service that the driver is running late or the order has been canceled (e.g., by the delivery service or the vendor). Responsive to determining that the first product cannot be delivered by the first delivery service within the first time period, service platform 122 sends, to an alternate delivery service, a third request to deliver an alternate product within the first time period and to the first location corresponding to the first user. The alternate product may thus take the place of the first product in blocks 214-222. Similarly, the alternate delivery service may take the place of the first delivery service. A similar situation may occur with the second product and delivery service and respective alternates.

In an example of the above non-delivery scenario, service platform 122 logic may determine that a selected delivery service or vendor will not accept or fulfill the order previously placed. In some embodiments, service platform 122 may cancel the system order with the identified delivery service or vendor. The system order may be placed again with a second delivery service or vendor, a third delivery service or vendor, and so on until the system order is fulfilled.

In another example, service platform 122 may determine that a user's order cannot be fulfilled. For example, there may not be any vendors or delivery services willing to provide the products and services of the order within the desired price range or by the desired time. Service platform 122 may make an alternative selection of products/services from the user order to fulfill and may place a second order with a delivery service and/or vendor. For example, the alternative selection of products/services may be one or more backup items specified in the user order.

In some embodiments, service platform 122 may determine that a delivery time for a product or service will be beyond the first time period. For example, the delivery time may be 1 minute, 15 minutes, 30 minutes, 60 minutes, etc. beyond the planned start time for the event. Service platform 122 may provide options to one or more parties to start, delay, or cancel the event. In some embodiments, a user may indicate that they are no longer available for the scheduled time, and service platform 122 may provide options to start, delay, or cancel the event. Service platform 122 may also determine that the user is at fault for a delayed or canceled event and may require compensation from the user (e.g., on behalf of the other users) or may give the user a partial refund or no refund. In some embodiments, service platform 122 may provide credit, discounts, or other forms of good will to one or more users (e.g., less than, equal to, or more than the amount previously paid by each user) as compensation for a delayed or canceled event.

In some embodiments, service platform 122 may provide a poll to all parties (e.g., via notification element 314 described with reference to FIG. 3) to elicit a group decision regarding whether to start, delay, or cancel the event. In some embodiments, service platform 122 may require a unanimous decision, a majority decision, or other form of consensus. Service platform 122 may prompt an event coordinator or administrator to make a decision if the parties cannot come to an agreement.

At operation 254, delivery platform 132A provides an indication to service platform 122 that an order of products and/or services was delivered to the first physical location corresponding to the first user. Similarly, at operation 256, delivery platform 132B provides an indication to service platform 122 that an order of products and/or services was delivered to the second physical location corresponding to the second user.

At operation 255, service platform 122 provides an indication to client device 110A associated with the first user that an order of products and/or services was delivered to the second physical location corresponding to the second user. Similarly, at operation 257, service platform 122 provides an indication to client device 110B associated with a second user that an order of products and/or services was delivered to the first physical location corresponding to the first user. In some embodiments, the indications may be anonymizing notifications that indicate to the first user (or second user) that products and services were delivered and/or signed for by the second user (or first user), but without revealing one or more of the location or other personal information of the second user (or first user). In some embodiments, an administrator or other user associated with service platform 122 (e.g., a customer help center) may contact users to provide delivery notifications and/or troubleshoot delivery issues while preserving privacy of other users. For example, an automated system or a human agent may respond to an inquiry from the first user about the delivery progress for a gift to the second user by providing the first user with an approximate delivery time while not revealing the second user's location directly (e.g., by giving an address) or indirectly (e.g., by giving an exact commute time from a vendor restaurant to the second user's home). Other private information, such as a user's real name (e.g., as opposed to a username or screen name) may be protected as well. Administrator users may further assist users with other actions such as choosing gifts, arranging supplemental deliveries, etc.

At operation 258, service platform 122 instructs event platform 142 to initiate the event. In some embodiments, service platform 122 instructs event platform 142 to initiate the event based on the indications that delivery of the respective products and/or services has been to the respective physical locations has been completed. For example, service platform 122 may start the event via API endpoint 144 of FIG. 1. In another example, service platform 122 may request users to log into the event (e.g., using a link or calendar invite). In some embodiments, service platform 122 may start the event at a time after all parties have received their orders, e.g., 30 minutes after. In some embodiments, service platform 122 may start the event after one or more (but not necessarily all) parties have received their orders. In some embodiments, service platform 122 may capture or record interactions (e.g., audio or video) between one or more users and/or between users and delivery drivers. For example, service platform 122 may record an influencer eating food that was chosen by followers, as well as follower reactions. In another example, service platform 122 may record a handoff between a user and a delivery driver to confirm delivery. Service platform 122 may also provide a code for a user to give to a delivery driver as an additional or alternative method of confirming delivery. In some embodiments, the processing logic may initiate an audio conference, chat, video conference, or other media for the event. In some embodiments, service platform 122 can send an invitation to client device 110A and 110B to join the virtual event once receiving confirmation that the products and/or services have been received at the first physical location associated with the first user and the second physical location associated with the second user.

In some embodiments, a party (e.g., user) that has not received their order by the start of the event may be restricted from entering the event until their order is received. In some embodiments, a party that has not received their order by the start of the event may be allowed to enter the event before their order is received.

In some embodiments, service platform 122 may continue to coordinate delivery of products and services during the event. For example, gifts may be planned for delivery once the event has started, or digital products and services may be delivered during the event (e.g., after a predetermined amount of time has passed or after a predetermined measure of engagement of users has occurred). In some embodiments, service platform 122 may similarly coordinate delivery of products at the end of the event or after the event.

Figure 3:
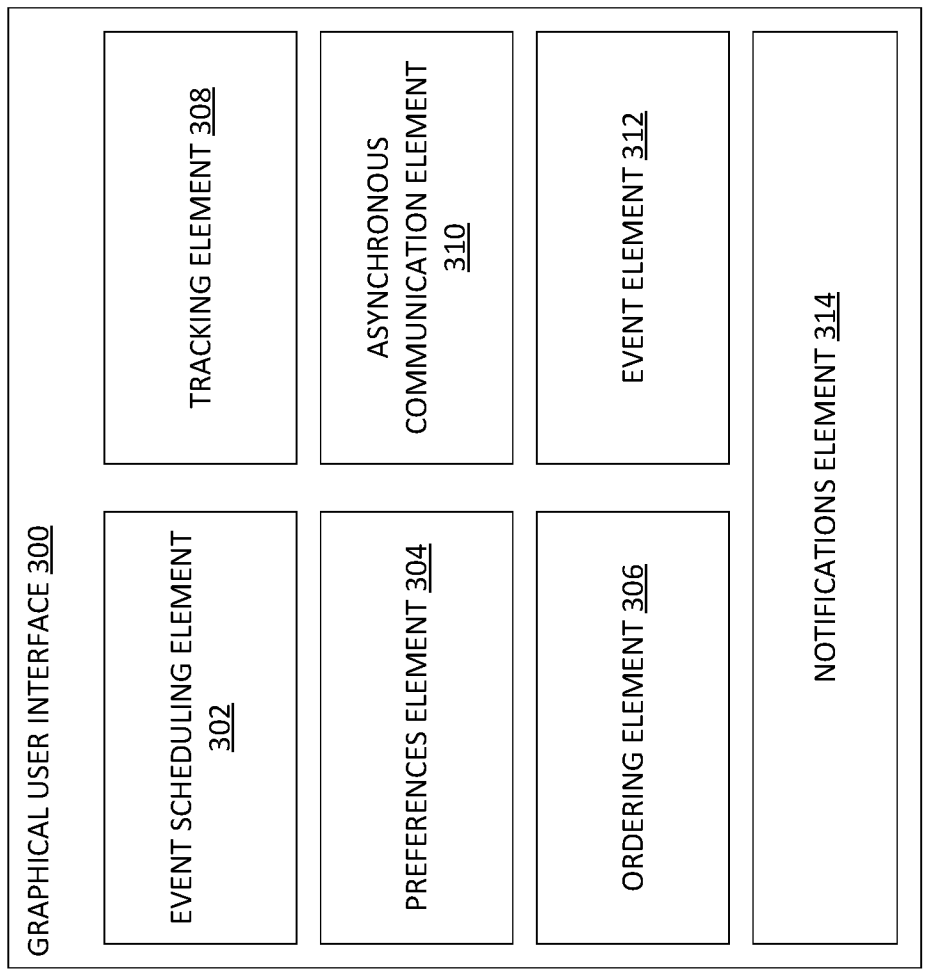
FIG. 3 is an example graphical user interface of a client device, in accordance with some embodiments of the disclosure.

FIG. 3 illustrates an example graphical user interface (GUI) 300 of a client device, in accordance with some embodiments of the disclosure. GUI 300 may be associated with application 112 of client devices 110A-Z, as well as the first and second users (e.g., influencer and follower users) described with reference to FIG. 2. GUI 300 includes event scheduling element 302, product/service ordering element 306, tracking element 308, asynchronous communication element 310, event element 312, and notification element 314. In some embodiments, the aforementioned elements can also be referred to as GUI element(s). In some embodiments, GUI 300 may include more, fewer, or different GUI elements than those depicted in FIG. 3. In some embodiments, GUI elements 302-314 may be or may include buttons, lists, text boxes, media players, maps, or other types of GUI elements. In some embodiments, GUI elements 302-314 may correspond to GUI elements on a shared page of an application, separate pages of an application, separate applications, or a combination of the above or other arrangements of GUI elements.

In some embodiments, event scheduling element 302 may enable users to schedule and/or accept events (e.g., as described with reference to operations 206-214). In some embodiments, event scheduling element 302 may depict one or more of dates, times and types of events for users to select or accept. In one example, an influencer user may provide a list of available time slots for an event (e.g., a lunch event) in event scheduling element 302. A follower user (or a plurality of follower users) may view the influencer user's availability in event scheduling element 302 on their respective client device and select an available event, date, and time to create the agreement.

In some embodiments, preferences element 304 may enable users to input preferences such as one or more of dietary restrictions, minimum/maximum price limits, etc. In some embodiments, preferences entered or selected in preferences element 304 by first and second users on their respective client devices may affect products and services available for ordering (e.g., on ordering element 306), as described with reference to FIG. 2. In another example, an event coordinator or administrator user may specify via preferences element 304 that all parties' deliveries must be received before or at the start of the event.

In some embodiments, ordering element 306 may enable users to view and select available products and services to order in association with an event. It can be noted that the products and services may be different for different users in some embodiments. For example, users may be in different geographical locations with different offerings in products and services. Furthermore, products and/or services may be physical (e.g., food, flowers) or digital (e.g., gift cards, in-app content). A search functionality may be provided in ordering element 306 to assist the user in identifying desirable products or services. In some embodiments, products and/or services provided to users may be ranked or ordered. For example, products and services may be ranked based on the user's previous or preferred selections, on the user's or other users' preferences (e.g., provided via preferences element 304), on feedback from other users (e.g., customer reviews), on price, etc. In some embodiments, products and services may be ranked based on the reliability of the product/service vendor, the delivery driver service, and/or the delivery driver. In some embodiments, featured or sponsored products and/or services (e.g., promoted by vendor or other party) may be ranked higher than unfeatured or unsponsored products and services. In some embodiments, ordering element 306 may display ranked products and/or services in a list with higher-ranked products and/or services at the top of the list and lower-ranked products and/or services further down the list. In some embodiments, higher-ranked products and/or services may be visible in ordering element 306, while lower-ranked products and/or services may be hidden in ordering element 306 (e.g., outside the visible area of a scrollable list).

In an embodiment, ordering element 306 may provide products and/or services that are available to recipient parties (e.g., influencing user) for selection and sponsoring by a gifting party (e.g., following user). In some embodiments, available products and/or services may be determined and ranked as described above, but using the location, dietary preferences, etc. of the recipient parties rather than the gifting party. For example, a follower user may select a product or service to gift to an influencer user based on the influencer user's preferences. In some embodiments, the selected product/service and/or identity of the gifting party may be hidden from the recipient parties to provide anonymity, protect personal information (e.g., sensitive data) or create a surprise. In some embodiments, products and/or services selected as gifts or favors may be delivered to the recipients in addition to products and/or services ordered by the recipients for delivery to themselves. In some embodiments, a recipient party may not be permitted to choose their own products and services via ordering element 306, and instead one or more gifting parties can choose products and services for the recipient. For example, one or more follower users may choose food for an influencer user to eat during a live event. In an additional example, one or more follower users may choose recipes and ingredients for an influencer user to use during a live event (e.g., a cooking, baking, or grilling event). In some embodiments, products and services may be ordered or received during the event in real time. Using the previous examples, followers may react to the influencer eating, cooking, or commenting on the food by ordering more food/ingredients for the influencer to try next. In some embodiments, such interactions and reactions may be captured or recorded. Captured content may be reused by the influencer as new content within the system or on social media platforms.

In some embodiments, ordering element 306 may further present available products and/or services to user devices associated with users for selecting one or more backup products and/or services. Backup products and/or services may be provided to users and selected by users in association with (e.g., at the same time as) the primary products and services provided to users and selected by users in ordering element 306. In some embodiments, available backup products and/or services may be provided and/or ranked based on the backup products and services being associated with different vendors or delivery services than the primary products and services, which may provide improved backup options in case a primary vendor or delivery service is unable to complete the primary order. In some embodiments, the system may automatically choose backup products and services on the user's behalf. For example, the system may choose the next highest-ranked product or service for the user or may choose a product or service closest to the primary product or service selected by the user in ordering element 306.

In some embodiments, system 100 of FIG. 1 (or a component thereof, e.g., service platform 122) may determine an updated availability or status of displayed or selected products and/or services for one or more parties. For example, the system may check (e.g., hours before or the day of the event) that all products are available and determine updated delivery estimates. In some embodiments, the system may also determine an updated availability or status of backup products. In some embodiments, the system may present updated products in ordering element 306 or may generate a notification with notification element 314 as described below. In some embodiments, the system may switch a primary product and/or service to a backup product and/or service or determine new backup product(s) and/or service(s) based on the updated availability or status of primary or backup product(s) and/or service(s).

In some embodiments, tracking element 308 may enable users to track the progress of their respective orders or the orders of other users as the orders are being delivered by the delivery services. Service platform 122 may receive real-time delivery tracking and/or an estimated delivery time from the delivery service (e.g., via API endpoints 134A-Z of FIG. 1) and may present the real-time tracking and/or estimated delivery time to one or more users via tracking element 308. In some embodiments, the system may receive traffic pattern data (e.g., live or predicted traffic statistics for roads along a delivery route) from the delivery service or a third-party mapping provider and may present the traffic pattern data as well (e.g., as an overlay).

In some embodiments, asynchronous communication element 310 may enable users to communicate without each other outside the context of the virtual event or during the virtual event. For example, an asynchronous communication element such as a chat box or comments section may be provided for parties to interact with each during the ordering window before the event. A user may share what they are ordering with other users or may make requests from other users. In some embodiments, natural language processing (NLP) may be used to set preferences (e.g., analogous to preferences element 304), rank products and services, or interact with other aspects of the system based on messages of individual parties. For example, an influencer user may post a chat message saying, "I love pepperoni pizza!" In response, processing logic may increase the rank of pepperoni pizza for follower users with ordering element 306.

In some embodiments, event element 312 may enable users to participate in the scheduled virtual event. For example, event element 312 may be a video conferencing element that presents streaming audio and video from service platform 122 or event platform 142. Similarly, event element 312 may send user audio and video (e.g., as captured by a client device microphone and camera) to service platform 122 or event platform 142.

In some embodiments, notifications element 314 may provide users with various notifications related to event scheduling, ordering products and services, product and service delivery, event participation, or other relevant activity. For example, notification element 314 may provide a prompt or reminder to all parties that have not select one or more products or services by the deadline(s) to place their orders. Other types of notifications, such as an email, or text message, or other form of verification message may be used in place of or in addition to notification element 314. In another example, notifications element 314 may provide verification messages to users for all goods and services selected. In some embodiments, verification messages may be provided to a sending/gifting party, a receiving party, or both.

Figure 4A:
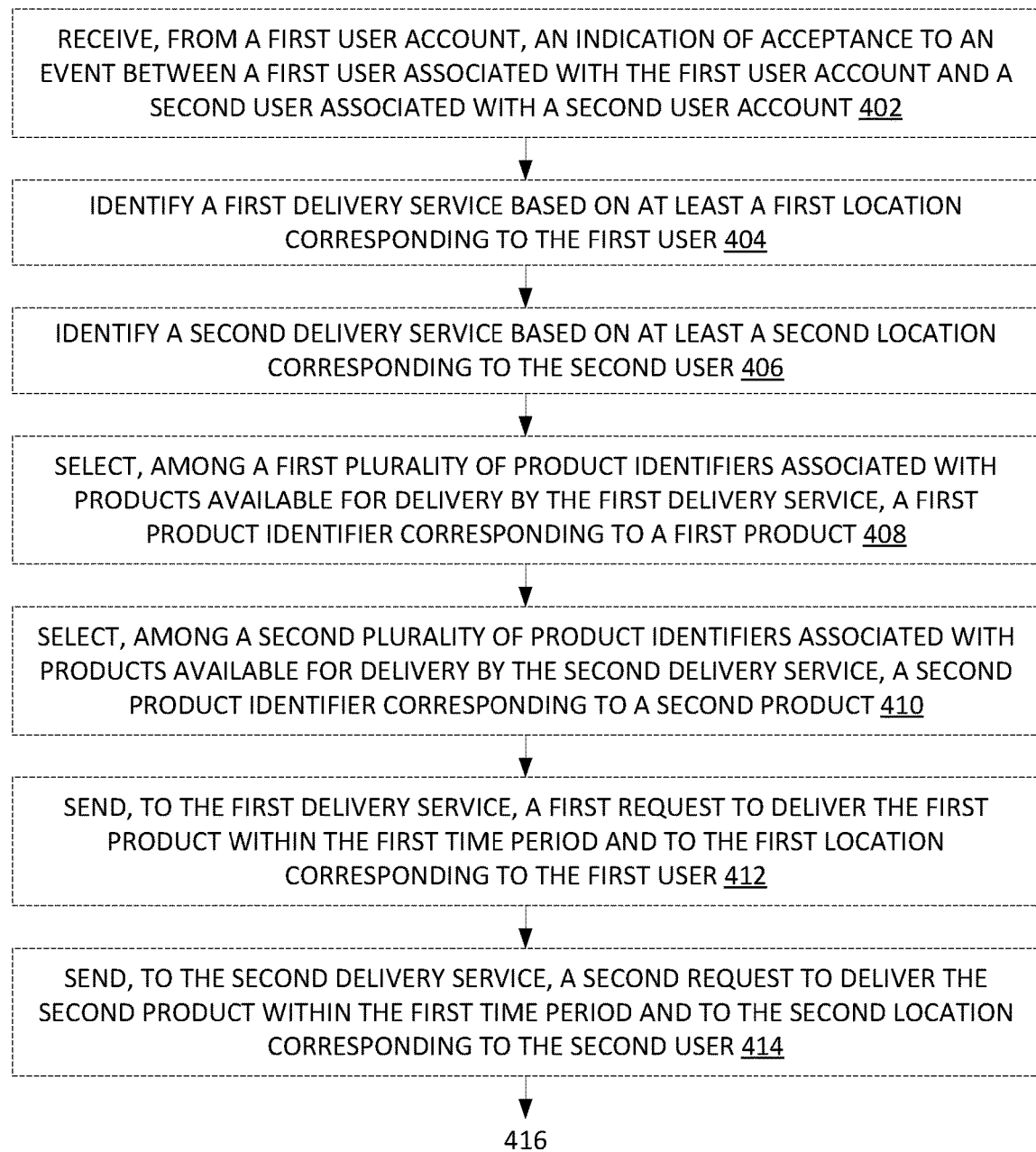
FIGS. 4A-B depict a flow diagram of one example of a method for synchronizing on-demand delivery services in association with a virtual event, in accordance with some embodiments of the disclosure.
Figure 4B:
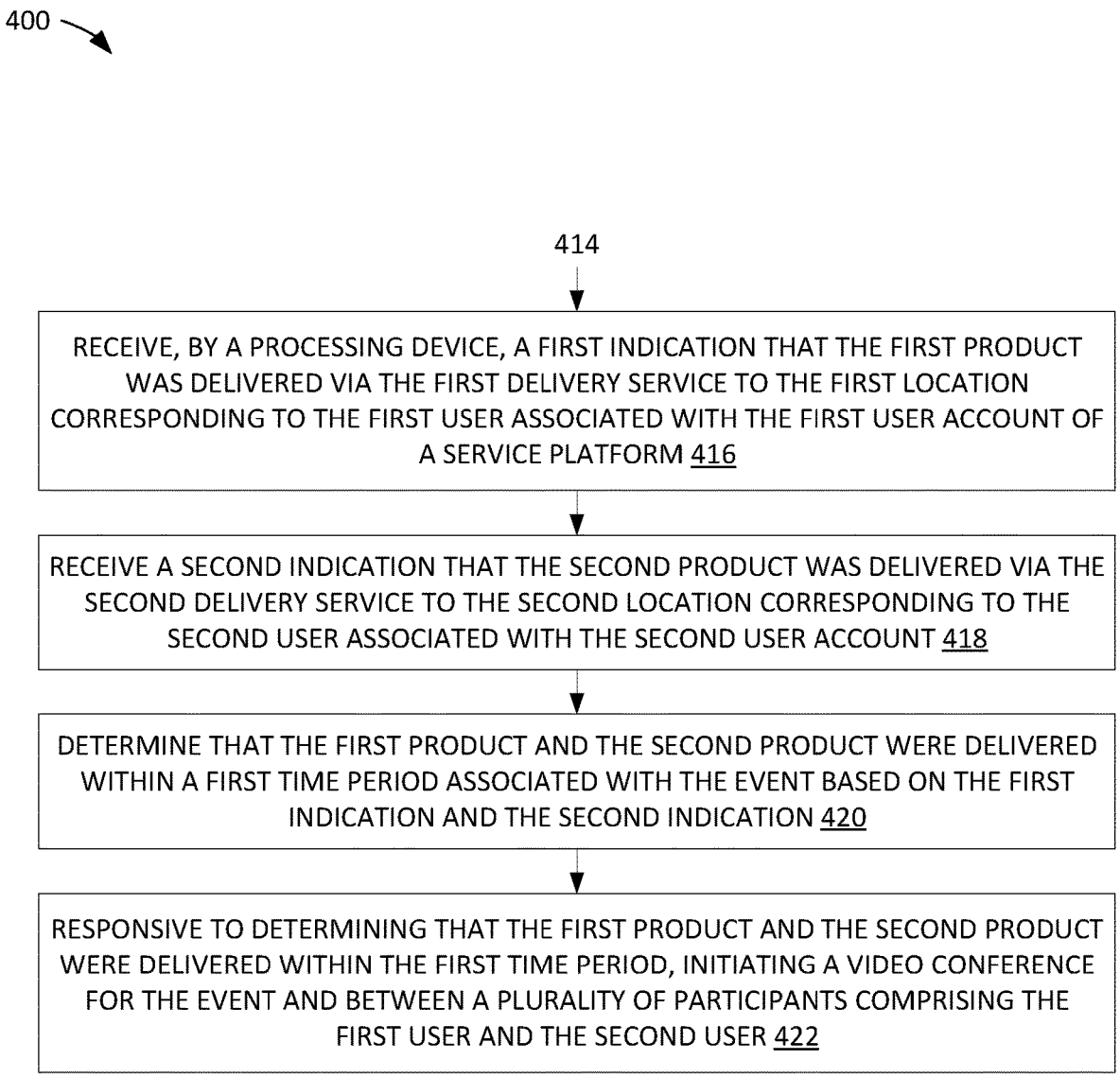

FIGS. 4A-B depict a flow diagram of an example method 400 for synchronizing food delivery services to correspond with a virtual event, in accordance with some embodiments of the disclosure. The method is performed by processing logic that may include hardware (circuitry, dedicated logic, etc.), software (e.g., instructions run on a processing device), or a combination thereof. In some embodiments, some or all the operations of method 400 may be performed by one or more components of system 100 of FIG. 1. In some embodiments, one or more operations of method 400 may be performed by service platform 122 of server 120 as described with respect to FIG. 1. In some embodiments, one or more operations of method 400 may be performed by application 112 at client devices 110A-Z. It may be noted that components described with respect to FIG. 1 may be used to illustrate aspects of FIGS. 4A-B. In some embodiments, the operations (e.g., blocks 402-422) can be the same, different, fewer, or greater. For example, the operations indicated with dashed lines (e.g., blocks 402-414) may be absent in some embodiments. In some embodiments, the operations may be in a different order than presented with respect to FIGS. 4A-B.

At block 402, processing logic receives, from a first user account, an indication of acceptance to an event between a first user associated with the first user account and a second user associated with a second user account. In some embodiments, block 402 corresponds to operation 214 of FIG. 2A.

At block 404, the processing logic identifies a first delivery service based on at least a first location corresponding to the first user. Similarly, at block 406, the processing logic identifies a second delivery service based on at least a second location corresponding to the second user. In some embodiments, blocks 404-406 correspond to operations 222-224 of FIG. 2B.

At block 408, the processing logic selects, among a first plurality of product identifiers associated with products available for delivery by the first delivery service, a first product identifier corresponding to a first product. Similarly, at block 410, the processing logic selects, among a second plurality of product identifiers associated with products available for delivery by the second delivery service, a second product identifier corresponding to a second product. In some embodiments, selecting the first and second product identifiers corresponds to operations 226-244 of FIG. 2A-C (e.g., receiving products from delivery services, filtering products, and/or receiving selections from client devices). In some embodiments, the first and second product pluralities of product identifiers may be the same or different pluralities. For example, the first and second pluralities of product identifiers may be the same if the first and second users live in the same geographic region served by the same delivery service(s) or different if the first and second users live in different geographic regions served by different delivery services. Similarly, the first and second product identifiers may be the same or different product identifiers. In some embodiments, the first product identifier corresponding to the first product may be one of a plurality of product identifiers corresponding to a plurality of products selected by the processing logic. Similarly, the second product identifier corresponding to the second product may be one of a plurality of product identifiers corresponding to a plurality of products selected by the processing logic. In some embodiments, the first and second pluralities of product identifiers may each be associated with products available for delivery by more than one delivery service or by different services. In such embodiments, the delivery services identified in blocks 402 and 404 may further be identified based on which delivery service(s) provides the selected/identified products.

In some embodiments, the processing logic may provide a prompt or reminder (e.g., via notification element 314 described with reference to FIG. 3) to all parties that have not select one or more products or services by the deadline(s). In some embodiments, the system may shift the event to a later time to provide more time for parties to place orders. In some embodiments, the system may automatically choose products or services for parties that have not yet ordered. For example, the system may pick the top-ranked item or items for a user based on their dietary preferences and price limit.

At block 412, the processing logic sends, to the first delivery service, a first request to deliver the first product within the first time period and to the first location corresponding to the first user. Similarly, at block 414, the processing logic sends, to the second delivery service, a second request to deliver the second product within the first time period and to the second location corresponding to the second user. In some embodiments, blocks 412-414 corresponds to operations 246-248 of FIG. 2C.

In an embodiment, to determine when to perform blocks 412-414, service platform 122 may estimate lead times based on historical data associated with delivery services 132A-B, wherein the estimated lead time reflects an estimated time between sending the order requests to deliver the products and the subsequent delivery of the products. Service platform 122 may further determine a third time period(s) to send the order requests to deliver the products based on the event time period and the estimated lead time, wherein the order requests to deliver to products are sent during the third time period(s). The historical data associated with delivery services 132A-B may include driver performance data associated with one or more drivers of the respective delivery services. The driver performance data may be obtained via API endpoints 134A-B.

At block 416, the processing logic receives a first indication that the first product was delivered via the first delivery service to the first location corresponding to the first user associated with the first user account of a service platform (e.g., service platform 122). Similarly, at block 418, the processing logic receives a second indication that the second product was delivered via the second delivery service to the second location corresponding to the second user associated with the second user account. In some embodiments, blocks 412-214 corresponds to operations 250-256 of FIG. 2C.

At block 420, the processing logic determines that the first product and the second product were delivered within a first time period associated with the event based on the first indication and the second indication. The first time period may be associated with the beginning time of the event and may include a window before or after the event to account for early or late delivery. In another example, the first time period may be associated with a pre-event delivery window. In another example, the first time period may be defined by the start and end times of the event. Various other time periods may be used in various embodiments. Time periods may be determined by, e.g., the first or second users, the service platform, an event platform, the first or second delivery services, or some other entity.

In some embodiments, the processing logic provides, to the first user account associated with the first user, a first notification that the second product was delivered to the second location corresponding to the second user, wherein the first notification to anonymizes personal information associated with the second user, the personal information comprising the second location and a name of the second user. Similarly, the processing logic may provide, to the second user account associated with the second user, a second notification that the first product was delivered to the first location corresponding to the first user, wherein the second notification to anonymizes personal information associated with the first user, the personal information comprising the first location and a name of the first user.

In some embodiments, the first time period is a delayed time period subsequent to an initial target time period, and wherein the delayed time period is associated with one or more of: a delayed delivery of the first product, an agreement between the first user and the second user to delay the event, or a delayed attendance of the first user. For example, the event may have initially been planned for the initial target time period, but a delivery driver may be late in delivering a product or service. The users, a system administrator, or the system may then decide to delay the start of the event to account for the late delivery, and the first user and second user can be notified accordingly. In another example, the users may agree to delay the event for various reasons and may indicate their agreement to the system. In another example, a user may not join the event on time or may indicate that they will be late to the event. If this delay is not accepted by the other user(s) or the system, the system may determine to delay the event. The system may further penalize the user (e.g., user account) for not joining the event on time (e.g., imposing a monetary penalty, removing the user from the service platform (permanently of temporarily).

In some embodiments, the processing logic may identify an issue associated with the event, such as the various delay issues described above. The processing logic may provide, to the second user account associated with second user, a third notification related to resolving the issue, the third notification to identify the issue, propose a resolution to the issue, and at least in part anonymize personal information associated with the first user.

At block 422, responsive to determining that the first product and the second product were delivered within the first time period, the processing logic initiates a video conference for the event between a plurality of participants comprising the first user and the second user. In some embodiments, block 422 corresponds to operation 258 of FIG. 2C.

In an alternative embodiment of block 404, the processing logic identifies one or more delivery services available to deliver to the first location corresponding to the first user. The processing logic further identifies a plurality of products available for delivery to the first location by the one or more delivery services. In an alternative embodiment of block 408, the processing logic provides, for selection to the first user account, identifiers of the plurality of products available for delivery to the first location. The processing logic receives, from the first user account, a selection of a first product identifier among the plurality of product identifiers, the first product identifier associated with the first product. The process logic selects, among the one or more delivery services, the first delivery service based on the selection by the first user account. In an embodiment, identifying the plurality of products available for delivery to the first location by the one or more services further comprises identifying the plurality of products based at least in part on a user preference associated with the second user account. In an embodiment, where multiple delivery services are available for the first and/or second location, service platform 122 selects, among the one or more delivery services at each location, the first and second delivery services of FIGS. 2A-C based on the selection by the respective first and second clients. The processing logic then proceeds to send the delivery request at block 412.

In some embodiments, the processing logic may continue to coordinate delivery of products and services during the event. For example, gifts may be planned for delivery once the event has started, or digital products and services may be delivered during the event (e.g., after a predetermined amount of time has passed or after a predetermined measure of engagement of users has occurred). In some embodiments, the processing logic may similarly coordinate delivery of products at the end of the event or after the event.

Figure 5:
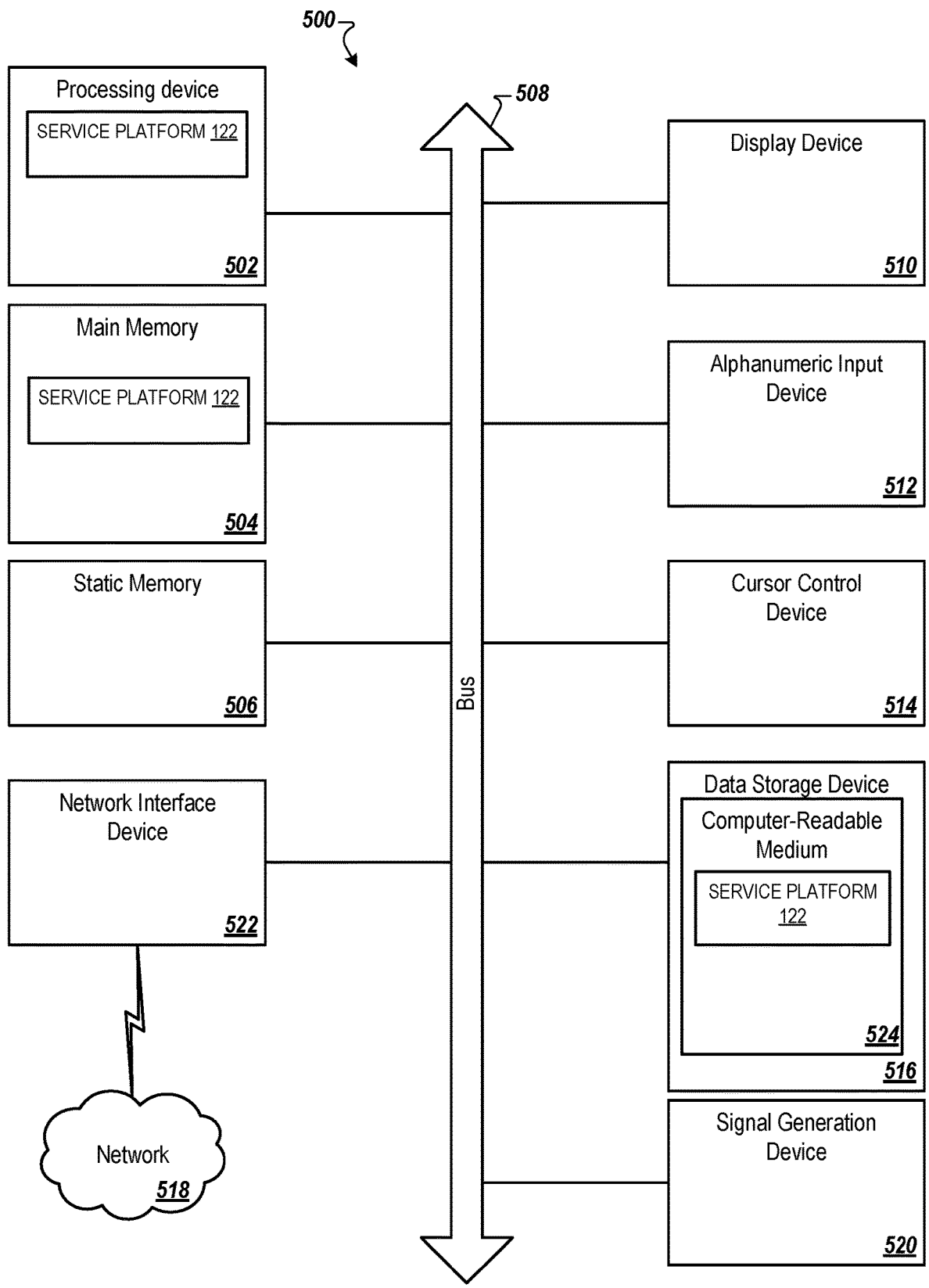
FIG. 5 is a block diagram illustrating an exemplary computer system, in accordance with some embodiments of the disclosure.

FIG. 5 is a block diagram illustrating an exemplary computer system 500, in accordance with an embodiment of the disclosure. The computer system 500 executes one or more sets of instructions that cause the machine to perform any one or more of the methodologies discussed herein. Set of instructions, instructions, and the like may refer to instructions that, when executed by computer system 500, cause computer system 500 to perform one or more operations of service platform 122. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine," in the context of computer system 500, shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 500 and of service platform 122 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 500 and of service platform 122 embodying any one or more of the methodologies or functions described herein. The sets of instructions of the system architecture 100 and of service platform 122 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "obtaining", "identifying", "determining", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first,"

"second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above-described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method for coordinating an event with deliveries of products or services to different locations, the method comprising:
   receiving, by a processing device, a first indication that a first product was delivered via a first delivery service to a first location corresponding to a first user associated with a first user account of a service platform;
   receiving a second indication that a second product was delivered via a second delivery service to a second location corresponding to a second user associated with a second user account;
   determining that the first product and the second product were delivered within a first time period associated with the event based on the first indication and the second indication; and
   responsive to determining that the first product and the second product were delivered within the first time period, initiating a video conference for the event and between a plurality of participants comprising the first user and the second user.

2. The method of claim 1, further comprising:
   receiving, from the first user account, an indication of acceptance to the event between the first user associated with the first user account and the second user associated with the second user account.

3. The method of claim 2, further comprising:
   responsive to the indication of acceptance to the event between the first user associated with the first user account and the second user associated with the second user account, identifying the first delivery service based on at least the first location corresponding to the first user; and
   identifying the second delivery service based on at least the second location corresponding to the second user.

4. The method of claim 2, further comprising:
   selecting, among a first plurality of product identifiers associated with products available for delivery by the first delivery service, a first product identifier corresponding to the first product; and
   selecting, among a second plurality of product identifiers associated with products available for delivery by the second delivery service, a second product identifier corresponding to the second product.

5. The method of claim 1, further comprising:
   sending, to the first delivery service, a first request to deliver the first product within the first time period and to the first location corresponding to the first user; and
   sending, to the second delivery service, a second request to deliver the second product within the first time period and to the second location corresponding to the second user.

6. The method of claim 5, further comprising:
   estimating a lead time based on historical data associated with the first delivery service, wherein the estimated lead time reflects an estimated time between sending the first request to deliver the first product and delivery of the first product; and
   determining a third time period to send the first request to deliver the first product based on the first time period and the estimated lead time, wherein the first request to deliver the first product is sent during the third time period.

7. The method of claim 1, further comprising:
   identifying one or more delivery services available to deliver to the first location corresponding to the first user;
   identifying a plurality of products available for delivery to the first location by the one or more delivery services;
   providing, for selection to the first user account, identifiers of the plurality of products available for delivery to the first location;
   receiving, from the first user account, a selection of a first product identifier among the plurality of product identifiers, the first product identifier associated with the first product; and
   selecting, among the one or more delivery services, the first delivery service based on the selection by the first user account.

8. The method of claim 7, wherein identifying the plurality of products available for delivery to the first location by the one or more delivery services, further comprises:
   identifying the plurality of products based at least in part on a user preference associated with the second user account.

9. The method of claim 1, further comprising:
   determining that the first product cannot be delivered by the first delivery service within the first time period; and
   responsive to determining that the first product cannot be delivered by the first delivery service within the first time period, sending, to an alternate delivery service, a third request to deliver an alternate product within the first time period and to the first location corresponding to the first user.

10. The method of claim 1, wherein the first time period is an initial target time period, wherein the first time period is delayed for a period of time, and wherein the delayed time period is associated with at least one of:
- a delayed delivery of the first product;
- an agreement between the first user and the second user to delay the event; or
- a delayed attendance of the first user.

11. The method of claim 10, wherein the delayed time period is associated with the delayed delivery of the first product, the method further comprising:
delaying the initiation of the video conference based on the delayed time period.

12. The method of claim 1, further comprising:
providing, to the first user account associated with the first user, a first notification that the second product was delivered to the second location corresponding to the second user, wherein the first notification anonymizes personal information associated with the second user, the personal information comprising the second location and a name of the second user; and
providing, to the second user account associated with the second user, a second notification that the first product was delivered to the first location corresponding to the first user, wherein the second notification anonymizes personal information associated with the first user, the personal information comprising the first location and a name of the first user.

13. The method of claim 1, further comprising:
identifying an issue associated with the event; and
providing, to the second user account associated with the second user, a third notification related to resolving the issue, the third notification to identify the issue, propose a resolution to the issue, and at least in part anonymize personal information associated with the first user.

14. The method of claim 13, further comprising:
delaying the initiation of the video conference based on the issue.

15. A system for coordinating an event with deliveries of products or services to different locations, the system comprising:
a memory device; and
a processing device coupled to the memory device, the processing device to perform operations comprising:
receiving, by the processing device, a first indication that a first product was delivered via a first delivery service to a first location corresponding to a first user associated with a first user account of a service platform;
receiving a second indication that a second product was delivered via a second delivery service to a second location corresponding to a second user associated with a second user account;
determining that the first product and the second product were delivered within a first time period associated with the event based on the first indication and the second indication; and
responsive to determining that the first product and the second product were delivered within the first time period, initiating a video conference for the event and between a plurality of participants comprising the first user and the second user.

16. The system of claim 15, the operations further comprising:
receiving, from the first user account, an indication of acceptance to the event between the first user associated with the first user account and the second user associated with the second user account.

17. The system of claim 16, the operations further comprising:
responsive to the indication of acceptance to the event between the first user associated with the first user account and the second user associated with the second user account, identifying the first delivery service based on at least the first location corresponding to the first user; and
identifying the second delivery service based on at least the second location corresponding to the second user.

18. A non-transitory computer-readable medium comprising instructions that, when executed by a processing device, cause the processing device to perform operations for coordinating an event with deliveries of products or services to different locations, the operations comprising:
receiving a first indication that a first product was delivered via a first delivery service to a first location corresponding to a first user associated with a first user account of a service platform;
receiving a second indication that a second product was delivered via a second delivery service to a second location corresponding to a second user associated with a second user account;
determining that the first product and the second product were delivered within a first time period associated with the event based on the first indication and the second indication; and
responsive to determining that the first product and the second product were delivered within the first time period, initiating a video conference for the event and between a plurality of participants comprising the first user and the second user.

19. The non-transitory computer-readable medium of claim 18, the operations further comprising:
receiving, from the first user account, an indication of acceptance to the event between the first user associated with the first user account and the second user associated with the second user account.

20. The non-transitory computer-readable medium of claim 18, the operations further comprising:
identifying one or more delivery services available to deliver to the first location corresponding to the first user;
identifying a plurality of products available for delivery to the first location by the one or more delivery services;
providing, for selection to the first user account, identifiers of the plurality of products available for delivery to the first location;
receiving, from the first user account, a selection of a first product identifier among the plurality of product identifiers, the first product identifier associated with the first product; and
selecting, among the one or more delivery services, the first delivery service based on the selection by the first user account.

* * * * *